US009339695B2

(12) United States Patent
Sullivan et al.

(10) Patent No.: US 9,339,695 B2
(45) Date of Patent: *May 17, 2016

(54) COMPOSITIONS CONTAINING TRANSPARENT POLYAMIDES FOR USE IN MAKING GOLF BALLS

(71) Applicant: Acushnet Company, Fairhaven, MA (US)

(72) Inventors: Michael J. Sullivan, Old Lyme, CT (US); David A. Bulpett, Boston, MA (US); Robert Blink, Newport, RI (US); Mark L. Binette, Mattapoisett, MA (US); Brian Comeau, Berkley, MA (US)

(73) Assignee: Acushnet Company, Fairhaven, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/309,066

(22) Filed: Jun. 19, 2014

(65) Prior Publication Data

US 2014/0302947 A1    Oct. 9, 2014

Related U.S. Application Data

(63) Continuation-in-part of application No. 14/285,871, filed on May 23, 2014, and a continuation-in-part of application No. 13/451,671, filed on Apr. 20, 2012, now Pat. No. 9,119,992.

(51) Int. Cl.
| | |
|---|---|
| A63B 37/00 | (2006.01) |
| A63B 37/02 | (2006.01) |
| C08L 77/00 | (2006.01) |
| C08G 69/40 | (2006.01) |
| A63B 45/00 | (2006.01) |
| C08K 5/00 | (2006.01) |
| C08K 5/5435 | (2006.01) |

(52) U.S. Cl.
CPC ......... *A63B 37/0051* (2013.01); *A63B 37/0003* (2013.01); *A63B 37/0024* (2013.01); *A63B 37/0031* (2013.01); *A63B 37/0033* (2013.01); *A63B 37/0039* (2013.01); *A63B 37/0043* (2013.01); *A63B 37/0044* (2013.01); *A63B 37/0062* (2013.01); *A63B 37/0063* (2013.01); *A63B 37/0075* (2013.01); *A63B 37/0076* (2013.01); *A63B 37/0078* (2013.01); *A63B 37/0087* (2013.01); *A63B 37/0092* (2013.01); *C08G 69/40* (2013.01); *C08L 77/00* (2013.01); *A63B 37/0045* (2013.01); *A63B 37/0046* (2013.01); *A63B 37/0049* (2013.01); *A63B 37/0061* (2013.01); *A63B 37/0065* (2013.01); *A63B 37/0069* (2013.01); *A63B 37/0095* (2013.01); *A63B 45/00* (2013.01); *A63B 2209/00* (2013.01); *C08K 5/0016* (2013.01); *C08K 5/5435* (2013.01); *C08L 2205/02* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 4,410,661 A | 10/1983 | Epstein et al. | |
| 5,703,166 A | 12/1997 | Rajagopalan et al. | |
| 5,824,746 A | 10/1998 | Harris et al. | |
| 5,886,103 A | 3/1999 | Bellinger et al. | |
| 5,981,654 A | 11/1999 | Rajagopalan | |
| 5,981,658 A | 11/1999 | Rajagopalan et al. | |
| 6,001,930 A | 12/1999 | Rajagopalan | |
| 6,150,462 A | 11/2000 | Rajagopalan et al. | |
| 6,187,864 B1 | 2/2001 | Rajagopalan | |
| 6,241,625 B1 | 6/2001 | Yokota et al. | |
| 6,274,669 B1 | 8/2001 | Rajagopalan | |
| 6,376,037 B1 | 4/2002 | Montanari et al. | |
| 6,476,130 B1 | 11/2002 | Rajagopalan et al. | |
| 6,528,560 B2 | 3/2003 | Buhler | |
| 6,538,099 B2 * | 3/2003 | Isobe et al. .................... 528/310 |
| 6,562,906 B2 | 5/2003 | Chen | |
| 6,756,436 B2 | 6/2004 | Rajagopalan et al. | |
| 6,774,184 B2 | 8/2004 | Rajagopalan et al. | |
| 6,800,690 B2 | 10/2004 | Rajagopalan et al. | |
| 6,831,137 B2 | 12/2004 | Torre et al. | |
| 6,833,400 B2 | 12/2004 | Ichikawa et al. | |
| 6,872,774 B2 | 3/2005 | Sullivan et al. | |
| 6,943,231 B2 | 9/2005 | Buhler | |
| 7,045,185 B2 | 5/2006 | Jacques et al. | |

(Continued)

FOREIGN PATENT DOCUMENTS

WO    2010002684    1/2010

OTHER PUBLICATIONS

Akema Les Polyamides Transparents product brochure; Mar. 2012, pp. 1-29.*

(Continued)

Primary Examiner — David Buttner
(74) Attorney, Agent, or Firm — Daniel W. Sullivan

(57) ABSTRACT

Multi-layered golf balls having at least one layer made of a polyamide composition containing a transparent polyamide polymer are provided. The transparent polyamide may be blended with other transparent or non-transparent polyamides. Thermoplastic polyamide elastomers such as polyether-amide block copolymers may be used. In one version, the composition comprises a blend of transparent polyamide, acid anhydride-modified polyolefin, and plasticizer. The golf ball includes a core having at least one layer and a cover having at least one layer. The polyamide composition may be used to form any core, cover, or other layer in the golf ball. In one version, the polyamide composition is used to form the inner cover layer.

18 Claims, 2 Drawing Sheets

(56) References Cited

U.S. PATENT DOCUMENTS

| | | |
|---|---|---|
| 7,297,737 B2 | 11/2007 | Fish, Jr. et al. |
| 7,348,046 B2 | 3/2008 | Liedloff et al. |
| 7,528,196 B2 | 5/2009 | Kim et al. |
| 8,309,643 B2 | 11/2012 | Thullen et al. |
| 8,399,557 B2 | 3/2013 | Montanari et al. |
| 8,507,598 B2 | 8/2013 | Buhler et al. |
| 2001/0046906 A1 | 11/2001 | Rajagopalan et al. |
| 2004/0009831 A1* | 1/2004 | Ohama et al. ............ 473/378 |
| 2006/0035724 A1* | 2/2006 | Watanabe ................ 473/371 |
| 2006/0166761 A1* | 7/2006 | Kim et al. ............... 473/371 |
| 2007/0100085 A1 | 5/2007 | Kim et al. |
| 2009/0318630 A1* | 12/2009 | Montanari et al. ......... 525/432 |
| 2010/0160079 A1 | 6/2010 | Kim et al. |
| 2010/0160082 A1 | 6/2010 | Rajagopalan et al. |
| 2010/0167845 A1 | 7/2010 | Kim et al. |
| 2010/0183837 A1 | 7/2010 | Hochstetter et al. |
| 2010/0203275 A1 | 8/2010 | Hoffmann et al. |
| 2010/0249307 A1* | 9/2010 | Stoppelmann ......... C08L 77/00 524/423 |
| 2011/0152450 A1 | 6/2011 | Kobayashi et al. |
| 2012/0223453 A1 | 9/2012 | Grimes et al. |
| 2013/0202831 A1 | 8/2013 | Chhun et al. |
| 2013/0247983 A1 | 9/2013 | Jousset et al. |
| 2014/0256472 A1* | 9/2014 | Sullivan et al. ........... 473/374 |
| 2014/0323243 A1* | 10/2014 | Sullivan et al. ........... 473/374 |
| 2015/0182807 A1* | 7/2015 | Bulpett et al. |
| 2015/0190680 A1* | 7/2015 | Bulpett et al. |

OTHER PUBLICATIONS

Grilamid TR A transparent polyamide with unlimited possibilities product brochure; Dec. 2003 pp. 1-34.*

Dow "Amplity GR Functional Polymers" (Aug. 2010) The Dow Chemical Company.

http:/www.tech-white-papers.com/ (Feb. 17, 2010) DuPont Polymer Modifiers, "Polyannide Toughening Using DuPont Polymer Modifiers".

* cited by examiner ized ionomer polymers (HNPs). These ionomer polymers are typically copolymers of ethylene and methacrylic acid or acrylic acid that are partially or fully neutralized. Metal ions such as sodium, lithium, zinc, and magnesium are used to neutralize the acid groups in the copolymer.

COMPOSITIONS CONTAINING TRANSPARENT POLYAMIDES FOR USE IN MAKING GOLF BALLS

CROSS-REFERENCE TO RELATED APPLICATIONS

This application is a continuation-in-part of co-pending, co-assigned U.S. patent application Ser. No. 14/285,871 having a filing date of May 23, 2014, which is a continuation-in-part of co-pending, co-assigned U.S. patent application Ser. No. 13/451,671 having a filing date of Apr. 20, 2012 U.S. Pat. No. 9,119,992, the entire disclosures of which are hereby incorporated herein by reference.

BACKGROUND OF THE INVENTION

1. Field of the Invention

The present invention generally relates to multi-layered golf balls and more particularly to golf balls having at least one layer made of polyamide compositions. The golf ball includes a core having at least one layer and a cover having at least one layer. The polyamide composition may be used to form any core, cover, or other layer in the golf ball. Preferably, a polyamide homopolymer, copolymer, blend or alloy having a transparent optical nature is used in the composition.

2. Brief Review of the Related Art

Multi-layered, solid golf balls are used today by recreational and professional golfers. Basically, these golf balls contain an inner core protected by a cover. The core acts as the primary engine for the ball and the cover helps provide the ball with durability and wear-resistance. The core and cover may be single or multi-layered. For example, three-piece golf balls having an inner core, inner cover layer, and outer cover layer are popular. In other instances, golfers will use a four-piece ball containing a dual-core (inner core and surrounding outer-core layer) and dual-cover (inner cover layer and surrounding outer cover layer). Intermediate layer(s) may be disposed between the core and cover layers to impart various properties. Thus, five-piece and even six-piece balls can be made. Normally, the core layers are made of a natural or synthetic rubber material or highly neutralized ionomer polymers (HNPs). These ionomer polymers are typically copolymers of ethylene and methacrylic acid or acrylic acid that are partially or fully neutralized. Metal ions such as sodium, lithium, zinc, and magnesium are used to neutralize the acid groups in the copolymer.

Such ethylene acid copolymer ionomer resins are relatively hard materials having good durability, cut-resistance, and toughness. The ionomers may be used to make cover, intermediate, and core layers. When used as a core material, the hard ionomer resin helps impart a higher initial velocity to the golf ball. This is particularly advantageous for driver shots off the tee. The ball tends to have good flight distance. However, one disadvantageous feature of such balls is they tend to have a hard "feel." Some players experience a harsher, less comfortable feel when their club face makes contact with these hard balls. The player senses less control and the harder ball tends to have low initial spin. It is generally more difficult to hit hard balls with the proper touch and control. This can be particularly troublesome when making approach shots with irons near the green.

Thus, the industry has looked at numerous non-ionomeric materials such as polyolefins, polyamides, polyesters, polyurethanes, polyureas, fluoropolymers, polyvinyl chlorides, polycarbonates, polyethers, polyimides, and the like for making components and layers in golf balls. For example, Kim et al, US Patent Application Publication US 2010/0167845 discloses golf balls having a core, at least one intermediate layer, and at least one cover layer prepared from blends of polyamides with functional polymer modifiers of the polyamide. The functional modifier of the polyamide can include $\alpha$-olefin copolymers or terpolymers having a glycidyl group, hydroxyl group, maleic anhydride group, or carboxylic group. The polyamide composition is preferably blended with a polyalkenamer rubber/functionalized organic modifier material.

Sullivan et al., U.S. Pat. No. 6,872,774 discloses a multi-layered golf ball having a core, intermediate layer, and cover. The intermediate layer is made of a composition comprising a non-ionomeric acid polymer and non-ionomeric stiffening polymer including blends of polyamides and polypropylene and polyethylene copolymers that have been grafted with maleic anhydride or sulfonate groups.

In Rajagopalan et al., U.S. Pat. No. 6,800,690 golf balls having at least one layer formed from a composition comprising a polyamide and non-ionomeric material including grafted or non-grafted metallocene-catalyzed olefinic polymers such as polyethylene and copolymers of ethylene are disclosed. The olefinic polymers may also contain functional groups such as epoxy, anhydride, amine, oxazoline, sulfonic acid, carboxylic acid, and their salts.

Although some non-ionomeric compositions containing polyamides as mentioned above may be somewhat effective for making certain components and layers in a golf ball, there is still a need for new compositions that can impart high quality performance properties to the ball. Particularly, there is a continuing need for improved core constructions in golf balls. The core material should have good toughness and provide the ball with high resiliency. The core material, however, should not be excessively hard and stiff so that properties such as feel, softness, and spin control are sacrificed. The present invention provides golf balls having an optimum combination of properties.

SUMMARY OF THE INVENTION

The present invention generally relates to multi-layered golf balls and more particularly to golf balls having at least one layer made of polyamide compositions. In one version, the ball comprises a dual core having an inner core and surrounding outer core layer; and a cover having at least one layer disposed about the core structure. The inner core has an outer surface and geometric center, while the outer core layer has an outer surface and inner surface. In one preferred embodiment, the inner core comprises a rubber composition and the outer core layer comprises a polyamide composition. In particular, the polyamide composition comprises: i) about 40 to about 100% by weight transparent polyamide. In one version, the geometric center of the inner core and surface of the outer core layer each has hardness, and the surface hardness of the outer core layer is greater than the center hardness of the inner core.

Suitable transparent polyamides have an amorphous, quasi-amorphous, semicrystalline, or microcrystalline structure. In one particularly preferred version, the polyamide composition comprises a transparent polyether-amide block copolymer. In some instances, the polyamide composition may comprise a blend of transparent polyamides, or a blend of transparent and non-transparent polyamides. In one preferred version, a transparent polyamide is used in the composition, and the transparent polyamide has a glass transition (Tg) temperature in the range of about 75° to about 160° C., preferably 80° C. to 95° C. The transparent polyamide preferably has a Charpy notched impact-resistance value of at least about 15 kJ/m² at 23° C., and preferably at least 50 kJ/m² at 23° C. In one instance, the transparent polyamide has a ratio of Charpy notched impact-resistance measured at 23° C. to Charpy notched impact-resistance measured at −30° C. of at least about 2.0, and preferably at least about 4.0. Preferably, the transparent polyamide has a transparency of at least about 85% and more preferably at least about 90%.

In one version, the center hardness of the inner core is about 15 Shore D or greater, and the surface hardness of the outer core layer is about 40 Shore D or greater, whereby the surface hardness of the outer core layer is greater than the center hardness of the inner core.

The polyamide compositions of this invention may be used in one or more core, intermediate or cover layers. For instance, the compositions may be used in an innermost core or center layer, an intermediate core layer, or in an outermost core layer. The composition also may be used, for example, in an inner, intermediate or outermost cover layer. The compositions have a good combination of properties including Coefficient of Restitution (COR) and compression so that they can be used to make various golf ball layers. In one version, a molded sphere comprising a polyamide composition of about 40 to about 100% transparent polyamide has a COR of at least about 0.700, preferably at least about 0.750; an Atti Compression of at least about 90, preferably at least about 150; and Shore D surface hardness of about 60 to about 80, preferably about 65 to about 75.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Figure 1:
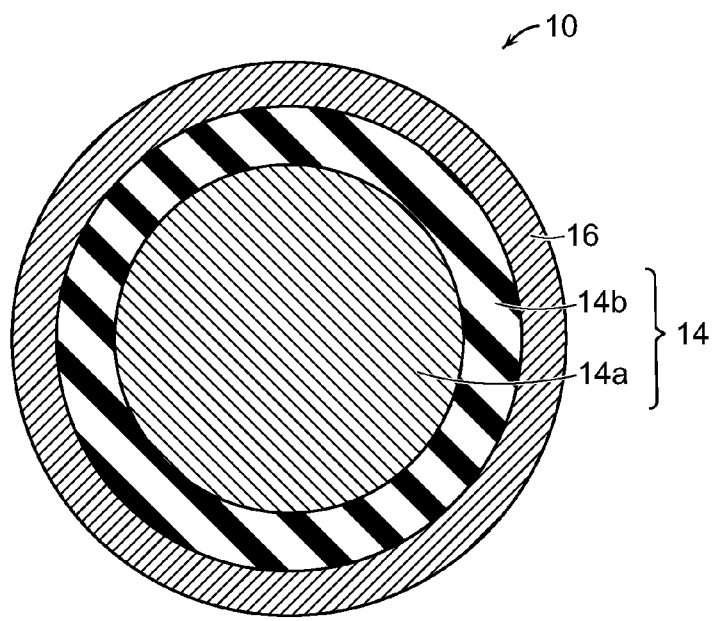
FIG. 1 is a cross-sectional view of a three-piece golf ball having a dual-core comprising an inner core/outer core, and a cover layer made in accordance with this invention.

The present invention relates generally to golf balls containing at least one component made from a polyamide composition. More particularly, the polyamide composition comprises about 40 to about 100 weight percent of transparent polyamide. The polyamide composition optionally may contain an acid anhydride-modified polyolefin and/or plasticizer.

Golf balls having various constructions may be made in accordance with this invention. For example, golf balls having two-piece, three-piece, four-piece, and five-piece constructions with single or multi-layered core, intermediate, and cover portions may be made. The term, "layer" as used herein means generally any spherical portion of the golf ball. More particularly, in one version, a two-piece golf ball having a core and surrounding cover is made. In another version, a three-piece ball containing a dual-core and cover may be made. The dual-core includes an inner core (center) and surrounding outer core layer. Four-piece golf balls comprising a dual-core and dual-cover an inner cover and outer cover also may be made. In yet another construction, a four-piece or five-piece golf ball having a multi-layered core comprising an inner core (center), intermediate core layer, and outer core layer, may be made. The golf balls of this invention may further contain an intermediate layer(s). As used herein, the term, "intermediate layer" means a layer of the ball disposed between the core and cover. The intermediate layer also may be referred to as a casing or mantle layer. The diameter and thickness of the different layers along with properties such as hardness and compression may vary depending upon the construction and desired playing performance properties of the golf ball.

The polyamide-containing compositions disclosed herein may be used in one or more core, intermediate or cover layers. For instance, the compositions may be used in an innermost core or center layer, and intermediate core layer or in an outermost core layer. Further the layer may be an inner, intermediate or outermost cover layer. For example in a golf ball having a three-layered cover, the polyamide-containing composition may be used in any of the three layers, but preferably is used in the inner or intermediate cover layer, or both. The polyamide-comprising compositions are thermoplastic compositions and may be adjacent to another thermoplastic composition or may be adjacent to a thermosetting composition. For example, in a three (3) or more layered-core construction, the center may be a thermosetting rubber composition, an intermediate core layer may comprise a polyamide-based composition and the outer core layer may be made from a thermosetting rubber composition. Alternatively, the center and intermediate core layer may comprise a thermosetting rubber and the outer core layer comprises the thermoplastic polyamide composition, and the like. In a two-piece construction comprising a core and a cover, either the core or cover or both layers may consist of the polyamide comprising composition.

Transparent Polyamides

Thermoplastic transparent polyamides are used to form the compositions of this invention. The composition comprises at least one transparent polyamide. The transparent polyamide by itself, may comprise a homopolymer, copolymers including block copolymer, or a blend or alloy thereof. In one preferred embodiment, the composition further comprises an acid anhydride-modified polyolefin and/or plasticizer as discussed below.

The term, "polymer" refers to, but is not limited to, oligomers, homopolymers, copolymers, terpolymers, and the like. The polymers may have various structures including, but not limited to, regular, irregular, alternating, periodic, random, block, graft, linear, branched, isotatic, syndiotactic, atactic, and the like. Polyamide polymers include, but are not limited to, polyamide copolymers (copolyamides) having two types of monomers, copolymers having three types of monomers, and copolymers having more than three types of monomers. Blends and alloys of polyamides also may be made in accordance with this invention as described further below.

By the term, "transparent," as used herein, it is meant having a light transmission of 50 percent or greater per the test procedures, ASTM D1003, using an Illuminate C light source. In general, transparent polyamides are classified as having a microcrystalline structure or amorphous structure. Both microcrystalline and amorphous transparent polyamides may be used in the present invention. It should be understood that while a transparent polyamide is preferably included in the composition, the final composition may have a transparent, translucent, or opaque optical nature. That is, the final composition may contain various additives including fillers, coloring agents, dyes, pigments, and the like that effect the optical nature of the composition. By the term, "translucent," as used herein, it is meant having a light transmission of greater than 1 percent per the test procedures, ASTM D1003, using an Illuminate C light source. Alternatively, the polyamide composition has a transparency of at least about 50%, and more preferably within a range having a lower limit of about 50%, 54%, 58% 60%, 65%, 68%, or 70% and an upper limit of about 75%, 75%, 80%, 84%, 90%, 92%, 94%, or 95% or greater as measured by ISO 13168-1,2 using a 2 mm thick sample measured at a wavelength of 560 nm.

Transparent polyamide polymers are commercially available, and these polyamides may be used in accordance with this invention. For example, copolyamides such as Platamid® 8020; semi-aromatic transparent polyamides such as Rilsan® Clear G170; transparent polyamides such as Rilsan® G120 Rnew; Rilsan®G830 Rnew and G830 L Rnew; Rilsan® G850; Rilsan® Clear G350 and G350L; Rilsan® G300 HI; and transparent polyamides that are partly based on bio-based raw materials such as Rilsan® Clear G830, all of which are available from Arkema, Inc. (King of Prussia, Pa.), may be used. Other suitable examples include Ultramid® polyamides, available from BASF; and Zytel™ and Dartek™ nylon resins, available from DuPont. EMS-Chemie AG (Domat/EMS, Switzerland) supplies different grades of transparent polyamides under the Grilamid mark, including; Grilamid® TR 30, TR55, TR90, XE 3997, XE 4028 grades, and these polyamides may be used per this invention. Grivory® G and GTR transparent polyamides also are available from EMS-Chemie AG and may be used in the compositions of this invention. Other suitable polyamides include Trogamid® and Vestamid® grades available from Evonik Industries, AG (Essen, Germany); Kopa® grades available from Kolon Plastics, Inc. (Gyeongsanglouk-do, Korea) Durethan® grades available from Lanxess AG (Cologne, Germany); Arlen® grades available from Mitsui Chemicals (Tokyo, Japan); and transparent amorphous nylons such as Ashlene® 726SB, 746, 747, 747, 851, D870 and D870L available from Ashley Polymers (Brooklyn, N.Y.). Still other suitable polyamides include Radici Radilon® CST copolyamides (Chgnolo d'Isola, Italy); Shakespeare Isocor® CN30XT and CN30BT nylon 610 resins (Shakespeare Engineered Nylons owned by Jarden Applied Materials of Columbia, S.C.), Toyobo Glamide® T-714E nylons (Osaka, Japan); TP Composites Elastoblend® PA12 CL nylons (Aston, Pa.); and Aegis® polyamide compositions, available from Honeywell Plastics (Morris Township, N.J.). Transparent polyamides including, but not limited to, polyether-amide, polyester-amide, polyether-ester-amide block copolymers, are particularly suitable for use in the invention herein, and more particularly, the transparent polyamide copolymers, Rilsan Clear G300 HI, Pebax Clear 300, and Pebax Clear 400 available from Arkema, Inc. (King of Prussia, Pa.) are particularly effective. Some representative examples of such polyamides are described in further detail in Tables IA-D and Tables IIA-D below.

Examples of transparent polyamides that may be used in the present invention also are described in the patent literature. For example, transparent homopolyamides and copolyamides which are amorphous or which exhibit a slight crystallinity such as those described in Montanari et al., US Patent Application Publication US 2010/0140846; Montanari et al., U.S. Pat. No. 6,376,037; and Montanari et al., U.S. Pat. No. 8,399,557, the disclosures of which are hereby incorporated by reference. Also, amorphous transparent or translucent polyamides that may be formed from the condensation of diamines with dicarboxylic acids or lactams; and blends or alloys of two or more different polyamides, as described in Grimes et al., US Patent Application Publication US 2012/0223453, the disclosure of which is hereby incorporated by reference, may be used. Polyamide copolymers such as a copolymers containing polyether blocks and polyamide blocks as described in Chhun, US Patent Application Publication US 2013/0202831, the disclosure of which is hereby incorporated by reference, may be used. The polyamide copolymers described in the Chhun '831 Publication are resistant to a high-velocity impact of at least 76.2 m/s (250 ft/s) according to the EN 166 standard; and have a Charpy notched impact strength of at least 90 kJ/m$^2$ according to the ISO 179 IeU standard; and preferably also has a chemical resistance such that it is capable of deforming, in flexion, by immersion in a solvent according to the ISO 22088-3 standard by at least 3% without breaking; that is light, having a density of less than 1.05 g/cm$^3$ measured according to the ISO 1183 D standard; and that is flexible and has an elastic modulus of less than 1000 MPa, preferably of less than 800 MPa, measured according to the ISO 527-2:93-1BA standard.

Transparent polyamides that may be used in accordance with this invention also include those polyamides described in Baler, U.S. Pat. No. 6,528,560; Torre et al., U.S. Pat. No. 6,831,136; Baler, U.S. Pat. No. 6,943,231; Thullen et al., U.S. Pat. No. 8,309,643; Baler, U.S. Pat. No. 8,507,598; and Hoffmann et al., US Patent Application Publication US 2010/0203275, the disclosures of which are hereby incorporated by reference.

In general, polyamides refer to high molecular weight polymers in which amide linkages (—CONH—) occur along the length of the molecular chain (Hawley's Condensed Chemical Dictionary, 13$^{th}$ Ed.). Suitable polyamides for use in the compositions of this invention may be obtained, for example, by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include, but are not limited to, nylon 6, nylon 6,6; nylon 6,10; nylon 11, and nylon 12. Aliphatic and aromatic polyamides and blends thereof may be prepared in accordance with this invention.

In general, polyamide homopolymers and copolymers are suitable for use in this invention. The specific monomers, reaction conditions, and other factors will be selected based on the desired polyamide polymer to be produced. There are two common methods for producing polyamide homopolymers. In a first method, a compound containing one organic acid-type end group and one amine end group is formed into a cyclic monomer. The polyamide is then formed from the monomer by a ring-opening polymerization. These polyamides are commonly designated as nylon 6, nylon 11, nylon 12, and the like, where the number indicates the number of carbon atoms making up the ring in the monomer. For example, nylon 6 is a homopolymer of caprolactam, that is, polycaprolactam.

The second method involves the condensation polymerization of a dibasic acid and a diamine. In general, this reaction takes place as follows:

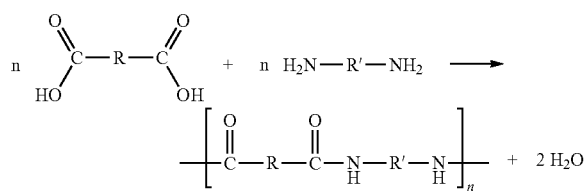

Conventional polyamides are commonly designated as nylon 4,6; nylon 6,6; nylon 6,9; nylon 6,10; nylon 6,12; and the like, where the first number indicates the number of carbon atoms connecting the two amine groups in the diamine and the second number indicates the number of carbon atoms connecting the two acid groups in the dibasic acid, including those in the acid groups. For example, nylon 6,6 is the reaction product of hexamethylenediamine and adipic acid.

Suitable polyamides include nylon 4, nylon 6, nylon 7, nylon 11, nylon 12, nylon 13, nylon 4,6; nylon 6,6; nylon 6,9; nylon 6,10; nylon 6,12; nylon 12,12; nylon 13,13; and mixtures thereof. More preferred polyamides include nylon 6, nylon 11, nylon 12, nylon 4,6; nylon 6,6; nylon 6,9; nylon 6,10; nylon 6,12; nylon 6/66; and nylon 6/69 and mixtures thereof.

Compositions of nylon 6, nylon 6,6; nylon 11, and nylon 12 and copolymers and blends thereof are suitable in the present invention. More specifically, polyamide compositions having mechanical properties that do not significantly change after the composition has been exposed to moisture are particularly effective. These polyamide compositions can be used to form the outer core layer and protect the inner core from moisture. The outer core layer encapsulates the inner core so that fluids do not penetrate therein. Because the polyamide compositions are relatively stable, they are particularly effective for making the core or cover layers in accordance with this invention.

More particularly, as noted above, transparent polyamides are particularly suitable for use in the invention herein. Such transparent polyamides include transparent polyamide copolymers (copolyamides). For example, polyether-amide and polyester-amide block copolymers may be used. Such polyamide copolymers are described, for example, in the above-mentioned Montanari et al., US Patent Application Publication US 2010/0140846; and U.S. Pat. Nos. 6,376,037 and 8,399,557. It should be understood that the term, "polyamide" as used in the present invention, is meant to include copolymers with polyamide blocks and polyether blocks, i.e., polyether block amide polymers, and the mixtures of these copolymers with the preceding polyamides. Polymers with polyamide blocks and polyether blocks result from the copolycondensation of polyamide sequences comprising reactive ends with polyether sequences comprising reactive ends, such as, inter alia:

a) polyamide sequences comprising diamine chain ends with polyoxyalkylene sequences comprising dicarboxylic chain ends,
b) polyamide sequences comprising dicarboxylic chain ends with polyoxyalkylene sequences comprising diamine chain ends obtained by cyanoethylation and hydrogenation of α'Ω-dihydroxylated aliphatic polyoxyalkylene sequences, known as polyetherdiols,
c) polyamide sequences comprising dicarboxylic chain ends with polyetherdiols, the products obtained being, in this specific case, polyetheresteramides.

Polyamide sequences comprising dicarboxylic chain ends originate, for example, from the condensation of α'Ω-aminocarboxylic acids, of lactams or of dicarboxylic acids and diamines in the presence of a chain-limiting dicarboxylic acid. The polyamide blocks are advantageously made of polyamide-12. The number-average molar mass of the polyamide sequences is between 300 and 15,000 and preferably between 600 and 5,000. The mass of the polyether sequences is between 100 and 6,000 and preferably between 200 and 3,000.

The polymers with polyamide blocks and polyether blocks can also comprise randomly distributed units. These polymers can be prepared by the simultaneous reaction of the polyether and of the precursors of the polyamide blocks. For example, polyetherdiol, a lactam (or an .alpha., .omega.-amino acid) and a chain-limiting diacid can be reacted in the presence of a small amount of water. A polymer is obtained which has essentially polyether blocks and polyamide blocks of very variable length but also the various reactants which have reacted randomly, which are statistically distributed along the polymer chain.

These polymers with polyamide blocks and polyether blocks, whether they originate from the copolycondensation of polyamide and polyether sequences prepared beforehand or from a one-stage reaction, exhibit, for example, Shore D hardnesses which can be from 20 to 90 and advantageously between 25 and 85, more preferably 30 to 80, and even more preferably 35 to 78 and an intrinsic viscosity between 0.8 and 2.5, measured in meta-cresol at 25° C.

Whether the polyester blocks derive from polyethylene glycol, polyoxypropylene glycol or polyoxytetramethylene glycol, they are either used as is and copolycondensed with polyamide blocks comprising carboxylic ends or they are aminated, in order to be converted into polyetherdiamines, and condensed with polyamide blocks comprising carboxylic ends. They can also be mixed with polyamide precursors and a chain-limiting agent in order to form polymers with polyamide blocks and polyether blocks having statistically distributed units. Polymers with polyamide and polyether blocks are disclosed in U.S. Pat. Nos. 4,331,786, 4,115,475, 4,195,015, 4,839,441, 4,864,014, 4,230,838 and 4,332,920. The polyether can be, for example, a polyethylene glycol (PEG), a polypropylene glycol (PPG) or a polytetramethylene glycol (PTMG). The latter is also known as polytetrahydrofuran (PTHF).

Whether the polyether blocks are introduced into the chain of the polymer with polyamide blocks and polyether blocks in the form of diols or of diamines, they are known for simplicity as PEG blocks or PPG blocks or PTMG blocks. The polyether blocks also may comprise different units, such as units derived from ethylene glycol, from propylene glycol or from tetramethylene glycol. The polymer with polyamide blocks and polyether blocks is advantageously such that the polyamide is the major constituent by weight, that is to say that the amount of polyamide which is in the form of blocks and that which is optionally statistically distributed in the chain represents 50% by weight or more of the polymer with polyamide blocks and polyether blocks. The amount of polyamide and the amount of polyether are advantageously, but not necessarily, in the ratio (polyamide/polyether) 50/50 to 80/20. The polyamide blocks and the polyether blocks of the same polymer (B) preferably have masses Mn of 1000/1000, 1300/650, 2000/1000, 2600/650 and 4000/1000 respectively.

Some examples of commercially-available transparent polyamides that may be used in accordance with this invention are shown in the following Tables IA-ID. In the Examples provided in Tables IA-ID, material properties of the compositions (100% polyamide), by and in themselves, are provided. The information set forth in Tables IA-ID was reported in technical data sheets made available by the various commercial suppliers. These polyamide samples are particularly preferred because of their transparent optical nature. In particularly preferred embodiments, the transparent polyamides, Rilsan® G120 Rnew; Rilsan®G830 Rnew; Rilsan® Clear G850; Rilsan® Clear G350; and Rilsan® Clear G300 HI are used.

TABLE IA

Properties of Transparent Polyamide Compositions
(Density, Melting Point, GlassTransition Temperature, Hardness)

| Material Name | Density (g/cm³) | MP° c | Tg° C. [1] | Ball Indentation Hardness H30 (MPa) [10] | Shore D (Peak) [2] | Shore D (15 sec) [2] |
|---|---|---|---|---|---|---|
| Pebax Clear 300 | 1.02 | 160 [1] | | | 59 | 53 |
| Pebax Clear 400 | 1.02 | 159 [1] | | | 64 | 56 |
| Rilsan Clear G170 | 1.05 | — | 168 | | 84 | 79 |
| Rilsan Clear G120 Rnew | 1.05 | — | 120 | | | |
| Rilsan Clear G830 Rnew | 1.01 | — | 135 | | 83 | 81 |
| Rilsan Clear G850 | 1.01 | — | 147 | | | |
| Rilsan Clear G350 | 0.99 | — | 145 | | 81 | 78 |
| Rilsan Clear G300 HI | 1.01 | 215 [1] | 90 | | 77 | 73 |
| Grilamid TR 30 | 1.15 | | 159 | 160 | | |
| Grilamid TR 55 | 1.06 | — | 160 | 120 | | |
| Grilamid TR 55 LX | 1.04 | | 110 | 110 | | |
| Grilamid TR 55 LX 2 | 1.03 | 178 | | | | |
| Grilamid TR 55 LZ | 1.02 | | 110 | 90 | | |
| Grilamid TR 60 | 1.06 | | 190 | | | |
| Grilamid TR 90 | 1.00 | — | 155 | 90 | 82 | |
| Grilamid TR 90 LXS | 1 | | 125 | 85 | | |
| Grilamid TR 90 NZ | 1 | | 155 | 90 | | |
| Gilamid TR 90 NZZ | 0.99 | | 155 | 80 | | |
| Grilamid TR 90 TL | 1.02 | | 135 | 120 | | |
| Grilamid TR 90 UV | 1 | | 155 | | | |
| Grilamid TR FE 5575 | 1.04 | | 110 | | | |
| Grilamid TR XE 3658 | 1.04 | | 125 | | | |
| Grilamid TR XE 3805 | 1 | | 153 | | | |
| Grilamid TR XE 3910 | 1 | | 153 | | | |
| Grilamid TR XE 3918 | 1.02 | | 145 | | | |
| Grilamid TR XE 3997 | 1 | | 155 | 90 | | |
| Grilamid TR XE 4028 | 1.06 | | 160 | 120 | | |
| Grilamid TR XE 4061 | 1 | | 155 | | | |
| Grivory GTR45 | 1.18 | | 125 | 145 | | |
| Durethan C 38 F | 1.13 | 212 [1] | | | | |
| Zytel 330 NC010 | 1.18 | | | | | |
| Isocor CN30BT | 1.14 | | 73 | | | |
| Isocor CN30XT | 1.14 | | 73 | | | |
| Ultramid Seal-Fit | 1.1 | | | | 85/65* | |
| Glamide T-714E | 1.18 | | | | | |
| Trogamid CX7323 | 1.02 | 250 [12] | 140 | 108 | 81 | |
| Trogamid CX9701 | 1.02 | 250 [12] | 140 | 108 | 81 | |
| Trogamid CX9704 | 1.02 | n.d. | 132 | 111 | 81 | |
| Trogamid CX9710 | 1.02 | 250 [12] | 140 | 110 | 80 | |
| Trogamid T5000 | 1.12 | — | 150 | 155 | 87 | |
| Trogamid T5002 | 1.12 | — | 150 | 155 | 86 | |
| Trogamid T5004 | 1.12 | — | 150 | 150 | 86 | |
| Trogamid TX7389 | 1.12 | — | 150 | 150 | 86 | |
| Trogamid BX7304 | 1.08 | — | 93 | 130 | 84 | |
| Vestamid E58-54 | 1.02 | | | | 58 | |

TABLE IB

Properties of Transparent Polyamide Compositions
(Flex Modulus, Tensile Modulus, Stress and Strain at Yield, Stress and Strain at Break)

| Material Name | Flex Modulus (MPa) [3] | Tensile Modulus (MPa) [4] | Stress @ Yield (MPa) [4] | Strain @ Yield (%) [4] | Stress @ Break (MPa) [4] | Strain @ Break (%) [4] |
|---|---|---|---|---|---|---|
| Pebax Clear 300 | 212 | | | | 49 [9] | >350 [9] |
| Pebax Clear 400 | 340 | | | | 54 [9] | >350 [9] |
| Rilsan Clear G170 | 1980 | 2020 | 74 | 9 | 58 | >100 |
| Rilsan Clear G120 Rnew | 1750 | 1860 | 68 | 6 | 52 | >100 |
| Rilsan Clear G830 Rnew | 1530 | 1690 | 55 | 7 | 60 | >150 |
| Rilsan Clear G850 | 1490 | 1620 | — | — | 60 | >150 |
| Rilsan Clear G350 | 1340 | 1480 | 51 | 8 | 50 | >150 |
| Rilsan Clear G300 HI | 740 | 715 | 24 | 6 | 50 | >250 |
| Grilamid TR 30 | | 2800 | 90 | 6 | 60 | >50 |

TABLE IB-continued

Properties of Transparent Polyamide Compositions
(Flex Modulus, Tensile Modulus, Stress and Strain at Yield, Stress and Strain at Break)

| Material Name | Flex Modulus (MPa) [3] | Tensile Modulus (MPa) [4] | Stress @ Yield (MPa) [4] | Strain @ Yield (%) [4] | Stress @ Break (MPa) [4] | Strain @ Break (%) [4] |
|---|---|---|---|---|---|---|
| Grilamid TR 55 | | 2200 | 75 | 9 | 50 | >50 |
| Grilamid TR 55 LX | | 1900 | 70 | 6 | 40 | >50 |
| Grilamid TR 55 LX 2 | | 1800 | 70 | 7 | 45 | |
| Grilamid TR 55 LZ | | 1600 | 55 | 6 | 40 | >50 |
| Grilamid TR 60 | | 2200 | 75 | 7 | 60 | |
| Grilamid TR 90 | | 1600 | 60 | 6 | 45 | >50 |
| Grilamid TR 90 LXS | | 1500 | 60 | 6 | 40 | >50 |
| Grilamid TR 90 NZ | | 1300 | 50 | 7 | 45 | >50 |
| Gilamid TR 90 NZZ | | 1300 | 50 | 7 | 45 | >50 |
| Grilamid TR 90 TL | | 1850 | 75 | 7 | 55 | >50 |
| Grilamid TR 90 UV | | 1600 | 60 | 6 | 45 | >50 |
| Grilamid TR FE 5575 | | 1900 | 70 | 6 | 40 | |
| Grilamid TR XE 3658 | | 1800 | 70 | 7 | 45 | |
| Grilamid TR XE 3805 | | 1700 | 65 | 5 | 50 | |
| Grilamid TR XE 3910 | | 1300 | 50 | 7 | 45 | |
| Grilamid TR XE 3918 | | 1400 | 60 | 7 | 55 | |
| Grilamid TR XE 3997 | | 1600 | 60 | 6 | 45 | >50 |
| Grilamid TR XE 4028 | | 2200 | 75 | 9 | 50 | >50 |
| Grilamid TR XE 4061 | | 1600 | 60 | 6 | 45 | >50 |
| Grivory GTR45 | | 3000 | 100 | 5 | — | >50 |
| Durethan C 38 F | | | | | | |
| Zytel 330 NC010 | | 2400 | 97 | 6 | | |
| Isocor CN30BT | | 2260 [13] | | | 70 | |
| Isocor CN30XT | | 2260 [13] | | | 70 | |
| Ultramid Seal-Fit | | 2500/—* | | 5/—* | | |
| Glamide T-714E | 2600/2500* | | | | 97/92* | 50/50* |
| Trogamid CX7323 | 1700 | 1400 | 60 | 8 | | >50 |
| Trogamid CX9701 | 1700 | 1500 | 60 | 8 | | >50 |
| Trogamid CX9704 | 1520 | 1400 | 60 | 8 | | >50 |
| Trogamid CX9710 | 1650 | 1400 | 60 | 8 | | >50 |
| Trogamid T5000 | 3000 | 2800 | 90 | 8 | | >50 |
| Trogamid T5002 | 3000 | 2800 | 90 | 8 | | >50 |
| Trogamid T5004 | 3000 | 2800 | 90 | 8 | | >50 |
| Trogamid TX7389 | 3000 | 2700 | 88 | 8 | | >50 |
| Trogamid BX7304 | 2700 | 2200 | 82 | 6 | | >50 |
| Vestamid E58-54 | | 185 | — | — | 39 | >200 |

TABLE IC

Properties of Transparent Polyamide Compositions
(Notched Charpy Impact-Resistance)

| Material Name | Notched Charpy @ −30° C. or −40° C. (kJ/m²) [5] | Notched Charpy @ 23° C. (kJ/m²) [5] | Notched Charpy Ratio 23° C./−30° C. (kJ/m²) [5] | Notched Charpy Difference 23° C. minus −30° C. or −40° C. (kJ/m²) [5] | Polymer Nomenclature |
|---|---|---|---|---|---|
| Pebax Clear 300 | No Break | No Break | | | PA |
| Pebax Clear 400 | No Break | No Break | | | PA |
| Rilsan Clear G170 | 13 | 13 | 1.0 | 0 | PA |
| Rilsan Clear G120 Rnew | — | — | — | — | PA |
| Rilsan Clear G830 Rnew | 10 | 11 | 1.1 | 1 | PA |
| Rilsan Clear G850 | — | 11 | — | — | PA |
| Rilsan Clear G350 | 10 | 12 | 1.2 | 2 | PA |
| Rilsan Clear G300 HI | 19 | 94 | 4.9 | 75 | PA |
| Grilamid TR 30 | 12 | 12 | 1.0 | 0 | PA 6I/6T |
| Grilamid TR 55 | 7 | 8 | 1.1 | 1 | PA 12/MACMI |
| Grilamid TR 55 LX | 8 | 9 | 1.1 | 1 | PA 12/MACMI + PA 12 |
| Grilamid TR 55 LX 2 | 7 | 8 | 1.1 | 1 | PA 12/MACMI + PA 12 |
| Grilamid TR 55 LZ | 8 | 20 | 2.5 | 12 | PA 12/MACMI + PA 12 |

TABLE IC-continued

Properties of Transparent Polyamide Compositions
(Notched Charpy Impact-Resistance)

| Material Name | Notched Charpy @ −30° C. or −40° C. (kJ/m²) [5] | Notched Charpy @ 23° C. (kJ/m²) [5] | Notched Charpy Ratio 23° C./ −30° C. (kJ/m²) [5] | Notched Charpy Difference 23° C. minus −30° C. or −40° C. (kJ/m²) [5] | Polymer Nomenclature |
|---|---|---|---|---|---|
| Grilamid TR 60 | 10 | 10 | 1.0 | 0 | PA MACMI/MACMT/12 |
| Grilamid TR 90 | 12 | 13 | 1.1 | 1 | PA MACM12 |
| Grilamid TR 90 LXS | 12 | 9 | 0.8 | −3 | PA MACM12 + PA12 |
| Grilamid TR 90 NZ | 15 | 22 | 1.5 | 7 | PA MACM12 |
| Gilamid TR 90 NZZ | 25 | 60 | 2.4 | 35 | PA MACM12 |
| Grilamid TR 90 TL | 11 | 10 | 0.9 | −1 | PA MACM 12 + MACM/MACMT/12 |
| Grilamid TR 90 UV | 9 | 10 | 1.1 | 1 | PA MACM12 |
| Grilamid TR FE 5575 | 8 | 9 | 1.1 | 1 | PA MACM12 + PA12 |
| Grilamid TR XE 3658 | 5 | 6 | 1.2 | 1 | PA MACM12 |
| Grilamid TR XE 3805 | 11 | 12 | 1.1 | 1 | PA MACM12 |
| Grilamid TR XE 3910 | 15 | 22 | 1.5 | 7 | PA MACM12 |
| Grilamid TR XE 3918 | 13 | 15 | 1.2 | 2 | — |
| Grilamid TR XE 3997 | 12 | 13 | 1.1 | 1 | PA MACM12 |
| Grilamid TR XE 4028 | 7 | 8 | 1.1 | 1 | PA 12/MACMI |
| Grilamid TR XE 4061 | 12 | 13 | 1.1 | 1 | — |
| Grivory GTR45 | 2 | 8 | 4.0 | 6 | PA 6I/6T |
| Durethan C 38 F | | | | | PA 6/IPDI |
| Zytel 330 NC010 | 4.5 | 9.9 | 2.2 | 5.4 | |
| Isocor CN30BT | | | | | |
| Isocor CN30XT | | | | | |
| Ultramid Seal-Fit | | | | | PA6/66/136 |
| Glamide T-714E | | | | | Aromatic/Non-spherulite |
| Trogamid CX7323 | 14 | 16 | 1.1 | 2 | PA PACM 12 |
| Trogamid CX9701 | 16 | 18 | 1.1 | 2 | PA PACM 12 |
| Trogamid CX9704 | 10 | 11 | 1.1 | 1 | PA PACM 12 |
| Trogamid CX9710 | 13 | 14 | 1.1 | 1 | PA PACM 12 |
| Trogamid T5000 | 7 | 12 | 1.7 | 5 | PA NDT/INDT (PA 6-3-T) |
| Trogamid T5002 | 6 | 10 | 1.7 | 4 | PA NDT/INDT (PA 6-3-T) |
| Trogamid T5004 | 6 | 10 | 1.7 | 4 | PA NDT/INDT (PA 6-3-T) |
| Trogamid TX7389 | 6 | 10 | 1.7 | 4 | PA NDT/INDT (PA 6-3-T) |
| Trogamid BX7304 | 8 | 9 | 1.1 | 1 | PA 6-3-T/XX |
| Vestamid E58-54 | 5 | No Break | | | |

TABLE ID

Properties of Transparent Polyamide Compositions
(Transparency, Refractive Index, H₂O Uptake)

| Material Name | Transparency (560 nm, 2 mm) (%) | Refractive Index | % H₂O Uptake @ 23° C. 50% RH [8] | % H₂O Uptake @ 23° C. Saturation [8] |
|---|---|---|---|---|
| Pebax Clear 300 | | | 0.7 | 1.6 |
| Pebax Clear 400 | | | | |
| Rilsan Clear G170 | 90.8 [6] | 1.538 [7] | 1.3 | 3.2 |
| Rilsan Clear G120 Rnew | 91.0 | — | | |
| Rilsan Clear G830 Rnew | 91.5 [6] | 1.512 [7] | 1.3 | 3.3 |
| Rilsan Clear G850 | 91.0 | — | | |
| Rilsan Clear G350 | 91.5 [6] | 1.507 [7] | 1.1 | 3 |
| Rilsan Clear G300 HI | 91.3 [6] | 1.503 [7] | 0.9 | 0.9 |
| Grilamid TR 30 | | | 2 | 7 |
| Grilamid TR 55 | | | 1.5 | 3.5 |
| Grilamid TR 55 LX | | | 1 | 2.5 |
| Grilamid TR 55 LX 2 | | | | |
| Grilamid TR 55 LZ | | | 1 | 2.5 |
| Grilamid TR 60 | | | | |
| Grilamid TR 90 | 94 | | 1.5 | 3.0 |
| Grilamid TR 90 LXS | | | 1.5 | 3 |
| Grilamid TR 90 NZ | | | 1.5 | 3 |
| Gilamid TR 90 NZZ | | | 1.5 | 3 |
| Grilamid TR 90 TL | | | 2 | 2.5 |
| Grilamid TR 90 UV | | | 1.5 | 3 |
| Grilamid TR FE 5575 | | | | |
| Grilamid TR XE 3658 | | | | |
| Grilamid TR XE 3805 | | | | |
| Grilamid TR XE 3910 | | | | |
| Grilamid TR XE 3918 | | | | |
| Grilamid TR XE 3997 | | | 1.5 | 3 |
| Grilamid TR XE 4028 | | | 1.5 | 3.5 |
| Grilamid TR XE 4061 | | | | |
| Grivory GTR45 | | | 2 | 7 |
| Durethan C 38 F | High | | 3 | 10 |

TABLE ID-continued

Properties of Transparent Polyamide Compositions
(Transparency, Refractive Index, H₂O Uptake)

| Material Name | Transparency (560 nm, 2 mm) (%) | Refractive Index | % H₂O Uptake @ 23° C. 50% RH [8] | % H₂O Uptake @ 23° C. Saturation [8] |
|---|---|---|---|---|
| Zytel 330 NC010 | | | | 5.8 |
| Isocor CN30BT | | | | |
| Isocor CN30XT | | | | |
| Ultramid Seal-Fit | | | | |
| Glamide T-714E | | | 4.5-5 | |
| Trogamid CX7323 | >88 | 1.516 | ~1.5 | 3.5 |
| Trogamid CX9701 | High, Permanent | | | |
| Trogamid CX9704 | High, Permanent | | | |
| Trogamid CX9710 | High, Permanent | | | |
| Trogamid T5000 | 90 [11] | 1.566 | ~3 | ~7.5 |
| Trogamid T5002 | Permanent | | | |
| Trogamid T5004 | Permanent | | | ~7.2 |
| Trogamid TX7389 | Permanent | | | |
| Trogamid BX7304 | Permanent | | | |
| Vestamid E58-54 | | | | |

Dry/Conditioned
1) Iso 11357/ASTM D 3418
2) ISO 868/ASTM D 2240 (Peak/Instantaneous)
3) 150 178/ASTM D 790
4) 150 527/ASTM D 638
5) 150 179
6) 150 13168-1,2
7) 150 489
8) 150 62 (equilibrium)
10) ISO 2039-1
11) 3.5 mm wall thickness
12) second heat
13) 50% RH Additional examples of commercially-available polyamides that may be used in accordance with this invention are shown in the following Tables IIA-D. In the Examples provided in Tables IIA-D, material properties of the compositions (100% polyamide), by and in themselves, are provided. The information set forth in Tables IIA-D was reported in technical data sheets made available by the various commercial suppliers.

TABLE IIA

Properties of Additional Polyamide Compositions
(Density, Melting Point, Glass Transition Temperature)

| Material Name | Polymer Nomenclature | Density (g/cm³) | MP ° C. [1] | Tg ° C. |
|---|---|---|---|---|
| Pebax Rnew 25R53 | Polyether Block Amide | 1.01 | 136 | |
| Pebax 2533 | Polyether Block Amide | 1.00 | 134 | |
| Pebax Rnew 35R53 | Polyether Block Amide | 1.02 | 135 | |
| Pebax 3533 | Polyether Block Amide | 1.00 | 144 | |
| Pebax MV 3000 | Polyether Block Amide | 1.02 | 158 | |
| Pebax MH 1657 | Polyether Block Amide | 1.14 | 204 | |
| Pebax MV 1074 | Polyether Block Amide | 1.07 | 158 | |
| Pebax MH 2030 | Polyether Block Amide | 1.14 | 200 | |
| Pebax MV 2080 | Polyether Block Amide | 1.07 | 160 | |
| Pebax Rnew 40R53 | Polyether Block Amide | 1.03 | 148 | |
| Pebax 4033 | Polyether Block Amide | 1.00 | 160 | |
| Pebax MX 1205 | Polyether Block Amide | 1.01 | 147 | |
| Pebax 4533 | Polyether Block Amide | 1.01 | 147 | |
| Pebax Rnew 55R53 | Polyether Block Amide | 1.03 | 167 | |
| Pebax 5533 | Polyether Block Amide | 1.01 | 159 | |
| Pebax MP 1878 | Polyether Block Amide | 1.09 | 195 | |
| Pebax MV 6100 | Polyether Block Amide | 1.04 | 170 | |
| Pebax MV 1041 | Polyether Block Amide | 1.04 | 170 | |
| Pebax Rnew 63R53 | Polyether Block Amide | 1.03 | 180 | |
| Pebax 6333 | Polyether Block Amide | 1.01 | 169 | |
| Pebax 7033 | Polyether Block Amide | 1.01 | 172 | |
| Pebax 7233 | Polyether Block Amide | 1.01 | 174 | |
| Pebax Rnew 70R53 | Polyether Block Amide | 1.03 | 186 | |
| Pebax Rnew 72R53 | Polyether Block Amide | 1.03 | 186 | |
| Pebax Rnew 80R53 | Polyether Block Amide | 1.02 | 188 | |
| Pebax INIT 1100 | Polyether Block Amide | 1.12 | 198 | |
| Pebax X2009 | Polyether Block Amide | 1.01 | 195 | |
| Rilsan CESV P010 TL | Polyphthalamide | 1.02 | 255 | |
| Rilsan CESVO P223 TL | Polyphthalamide | 1.03 | 255 | |
| KOPA KN136 | PA 6 | 1.14 | 220 [7] | |
| KOPA KN190 | PA 6 | 1.14 | 220 [7] | |
| Grilamid RDS 4836 | PA 6I/6T + PA 12/X | >1.00 | | |
| Grilamid RDS 4835 | PA MACM12 + PA 12/X | >1.00 | | |
| Ultramid B-3 Nylon | PA6 | 1.13 | 220 | 60 |
| Nyconomer 973 | PA Terpolymer | 1.11 | 160 | |
| Vestamid E55-S3 | Polyether Block Amide | 1.03 | | |
| Vestamid E62-S3 | Polyether Block Amide | 1.03 | | |
| Vestamid EX9200 | Polyether Block Amide | 1.01 | | |
| Trogamide BX9724 | PA 6-3-T/XX | 1.48 | 260 | 93 |
| Trogamide T-GF35 | PA NDT/INDT | 1.40 | — | 150 |

TABLE IIB

Properties of Additional Polyamide Compositions
(Hardness, Flex Modulus, Tensile Modulus, Stress and Strain at Yield)

| Material Name | Shore D (Peak) [2] | Shore D (15 sec) [2] | Flex Modulus (MPa) [3] | Tensile Modulus (MPa) [4] | Stress @ Yield (MPa) [4] | Strain @ Yield (%) [4] |
|---|---|---|---|---|---|---|
| Pebax Rnew 25R53 | 26 | 22 | 20 | 15 | | |
| Pebax 2533 | 27 | 22 | 12 | 10 | — | — |
| Pebax Rnew 35R53 | 32 | 25 | 40 | | | |
| Pebax 3533 | 33 | 25 | 21 | 20 | — | — |
| Pebax MV 3000 | 35 | | 45 | | | |
| Pebax MH 1657 | 40 | | 80 | | | |
| Pebax MV 1074 | 40 | | 80 | | | |
| Pebax MH 2030 | 40 | | 80 | | | |
| Pebax MV 2080 | 40 | | 80 | | | |
| Pebax Rnew 40R53 | 42 | 39 | 75 | | | |
| Pebax 4033 | 42 | 35 | 77 | 74 | — | — |
| Pebax MX 1205 | 46 | 41 | 86 | 79 | — | — |
| Pebax 4533 | 46 | 41 | 86 | | | |
| Pebax Rnew 55R53 | 53 | 51 | 160 | | | |
| Pebax 5533 | 54 | 50 | 170 | 160 | 12 | 25 |
| Pebax MP 1878 | 58 | | 180 | | | |
| Pebax MV 6100 | 58 | | 210 | | | |
| Pebax MV 1041 | 60 | | 270 | | | |
| Pebax Rnew 63R53 | 61 | 56 | 245 | | | |
| Pebax 6333 | 64 | 58 | 285 | 287 | 18 | 22 |
| Pebax 7033 | 69 | 61 | 390 | 383 | 22 | 20 |
| Pebax 7233 | 69 | 61 | 513 | 521 | 26 | 18 |
| Pebax Rnew 70R53 | 70 | 62 | | | | |
| Pebax Rnew 72R53 | 71 | 65 | 560 | | | |
| Pebax Rnew 80R53 | 73 | 67 | 850 | | | |
| Pebax INIT 1100 | 75 | | 440 | | | |
| Pebax X2009 | | | | | | |
| Rilsan CESV P010 TL | 74 | 64 | 820 | 880 | | |
| Rilsan CESVO P223 TL | | | 520 | | | |
| KOPA KN136 | | | 2942 | | | |

TABLE IIB-continued

Properties of Additional Polyamide Compositions
(Hardness, Flex Modulus, Tensile Modulus, Stress and Strain at Yield)

| Material Name | Shore D (Peak)[2] | Shore D (15 sec)[2] | Flex Modulus (MPa)[3] | Tensile Modulus (MPa)[4] | Stress @ Yield (MPa)[4] | Strain @ Yield (%)[4] |
|---|---|---|---|---|---|---|
| KOPA KN190 | | | 2942 | | | |
| Grilamid RDS 4836 | | | | | | |
| Grilamid RDS 4835 | | | | | | |
| Ultramid B-3 Nylon | | | | 3200 | | 4.5 |
| Nyconomer 973 | | | | | | |
| Vestamid E55-S3 | | 55 | | 220 | — | — |
| Vestamid E62-S3 | | 62 | | 370 | — | — |
| Vestamid EX9200 | | 68 | | 750 | 31 | 19 |
| Trogamide BX9724 | 90 | | 12000 | 11000 | | |
| Trogamide T-GF35 | 89 | | 12000 | 10000 | | |

TABLE IIC

Properties of Additional Polyamide Compositions
(Stress and Strain at Break, Refractive Index, and H₂O Uptake)

| Material Name | Stress @ Break (MPa)[4] | Strain @ Break (%)[4] | Refractive Index | Equilibrium H₂O Uptake @ 23° C. 50% RH (%)[6] | 24 Hour H₂O Uptake @ 23° C. Saturation (%)[6] |
|---|---|---|---|---|---|
| Pebax Rnew 25R53 | 34 | >700 | | | |
| Pebax 2533 | 32 | >750 | | 0.4 | 1.2 |
| Pebax Rnew 35R53 | 30 | >700 | | 0.5 | 1.3 |
| Pebax 3533 | 39 | >600 | | 0.4 | 1.2 |
| Pebax MV 3000 | 35 | 500 | | 1 | 28 |
| Pebax MH 1657 | 32 | >500 | 1.508 | 4.5 | 120 |
| Pebax MV 1074 | 30 | >700 | 1.502 | 1.4 | 48 |
| Pebax MH 2030 | | | 1.508 | 4.5 | 120 |
| Pebax MV 2080 | 30 | >700 | 1.502 | 1.4 | 48 |
| Pebax Rnew 40R53 | 45 | >600 | | 0.5 | 1.4 |
| Pebax 4033 | 40 | >450 | | 0.5 | 1.2 |
| Pebax MX 1205 | 42 | >550 | | 0.4 | 1.2 |
| Pebax 4533 | 42 | >550 | | 0.4 | 1.2 |
| Pebax Rnew 55R53 | 45 | >400 | | 0.7 | 1.5 |
| Pebax 5533 | 52 | >450 | | 0.6 | 1.2 |
| Pebax MP 1878 | 60 | 550 | 1.35 | | 6.7 |
| Pebax MV 6100 | 48 | — | | 0.9 | 11 |
| Pebax MV 1041 | 44 | 450 | | 0.9 | 12 |
| Pebax Rnew 63R53 | 51 | >400 | | 0.8 | 1.5 |
| Pebax 6333 | 53 | >350 | | 0.7 | 1.1 |
| Pebax 7033 | 54 | >350 | | 0.7 | 0.9 |
| Pebax 7233 | 56 | >300 | | 0.7 | 0.9 |
| Pebax Rnew 70R53 | 57 | >350 | | 0.7 | 1.0 |
| Pebax Rnew 72R53 | 55 | >300 | | 0.8 | 0.7 |
| Pebax Rnew 80R53 | 55 | >300 | | 0.8 | 0.7 |
| Pebax INIT 1100 | 71 | >300 | | — | — |
| Pebax X2009 | | | | | |
| Rilsan CESV P010 TL | 41 | >130 | | | |
| Rilsan CESVO P223 TL | 22 | >130 | | | |
| KOPA KN136 | 82 | 90 | | | |
| KOPA KN190 | 84 | 150 | | | |
| Grilamid RDS 4836 | | | | | |
| Grilamid RDS 4835 | | | | | |
| Ultramid B-3 Nylon | 90 | 15 | | | |
| Nyconomer 973 | | | | | |
| Vestamid E55-S3 | 38 | >200 | | | |
| Vestamid E62-S3 | 42 | >200 | | | |
| Vestamid EX9200 | — | >200 | | | |
| Trogamide BX9724 | 220 | 3.2 | | | |
| Trogamide T-GF35 | 165 | 2.4 | | | |

TABLE IID

Properties of Additional Polyamide Compositions
(Notched Charpy Impact-Resistance)

| Material Name | Notched Charpy @ −30 or −40° C. (kJ/m²)[5] | Notched Charpy @ 23° C. (kJ/m²)[5] | Notched Charpy Ratio 23° C./−30 or −40° C. (kJ/m²)[5] | Notched Charpy Difference 23° C. minus −30 or −40° C. (kJ/m²)[5] |
|---|---|---|---|---|
| Pebax Rnew 25R53 | No Break | No Break | | |
| Pebax 2533 | No Break | No Break | | |
| Pebax Rnew 35R53 | No Break | No Break | | |
| Pebax 3533 | No Break | No Break | | |
| Pebax MV 3000 | | | | |
| Pebax MH 1657 | | | | |
| Pebax MV 1074 | | | | |
| Pebax MH 2030 | | | | |
| Pebax MV 2080 | | | | |
| Pebax Rnew 40R53 | No Break | No Break | | |
| Pebax 4033 | No Break | No Break | | |
| Pebax MX 1205 | No Break | No Break | | |
| Pebax 4533 | No Break | No Break | | |
| Pebax Rnew 55R53 | No Break | No Break | | |
| Pebax 5533 | No Break | No Break | | |
| Pebax MP 1878 | | | | |
| Pebax MV 6100 | | | | |
| Pebax MV 1041 | | | | |
| Pebax Rnew 63R53 | 22 | No Break | | |
| Pebax 6333 | 20 | No Break | | |
| Pebax 7033 | 20 | 120 | 6.0 | 100 |
| Pebax 7233 | 10 | 15 | 1.5 | 5 |
| Pebax Rnew 70R53 | 15 | No Break | | |
| Pebax Rnew 72R53 | 16 | 46 | 2.9 | 30 |
| Pebax Rnew 80R53 | 16 | 43 | 2.7 | 27 |
| Pebax INIT 1100 | | | | |
| Pebax X2009 | | | | |
| Rilsan CESV P010 TL | 14 | 76 | 5.4 | 62 |
| Rilsan CESVO P223 TL | 9 | 76 | 8.4 | 67 |
| KOPA KN136 | | | | |
| KOPA KN190 | | | | |
| Grilamid RDS 4836 | | | | |
| Grilamid RDS 4835 | | | | |
| Ultramid B-3 Nylon | | 8 | | |
| Nyconomer 973 | | | | |
| Vestamid E55-S3 | 22 | No Break | | |
| Vestamid E62-S3 | 8 | 120 | 15.0 | 112 |
| Vestamid EX9200 | 6 | 33 | 5.5 | 27 |
| Trogamide BX9724 | 10 | 14 | 1.4 | 4 |
| Trogamide T-GF35 | 8 | 11 | 1.4 | 3 |

1) ISO 11357/ASTM D 3418
2) ISO 868/ASTM D 2240 (Peak/Instantaneous)
3) ISO 178/ASTM D790
4) ISO 527/ASTM D638
5) ISO 179
6) ISO 62/ASTM D570
7) ISO D789

Polyamide Blends

Blends of polyamides also may be used in accordance with this invention. For example, a blend of transparent polyamides or a blend of transparent and non-transparent polyamides may be used in accordance with this invention. In particular, a blend of transparent polyamide and a thermoplastic polyamide elastomer (typically a copolymer of polyamide and polyester/polyether) may be used. The polyamide elastomer may be transparent or non-transparent. Many polyamide elastomers comprise a hard polyamide segment (for example, nylon 6, nylon 6,6; nylon 11, nylon 12 and the like) and a polyether or polyester as a soft segment. Suitable polyamide elastomers that can be used to form the compositions of this invention include, for example. polyether-amide block copolymers, available from Arkema, Inc. (Columbs, France) as Pebax® resins. In general, these block copolymers have thermoplastic properties (softens when exposed to heat and returns to original condition when cooled) properties and elastomeric properties (can be stretched and then returns to a near original condition when released) properties. The ratio of hard to soft segments and the length, sequence, and like of the segments are significant factors in determining the properties of the resulting block copolymer.

In general, polyether amide block copolymers may be prepared by polycondensation of a polyamide with carboxyl end-groups with a polyether glycol. These block copolymers have been prepared using polyethylene glycol, polypropylene glycol, polytetramethylene glycol, copolyethers derived therefrom, and copolymers of THF and 3-alkylTHF as shown by U.S. Pat. Nos. 4,230,838, 4,252,920, 4,349,661, 4,331,786 and 6,300,463, the disclosures of which are hereby incorporated by reference. The general structure of the polyether amide block copolymer may be represented by the following formula (I):

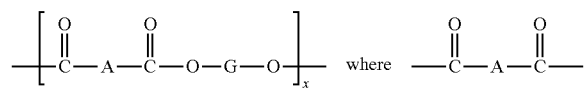

represents a polyamide segment containing terminal carboxyl groups or acid equivalents thereof (for example, diacid anhydrides, diacid chlorides or diesters) and

—O-G-O— is a polyether segment.

Different grades of Pebax® polyether amide block copolymers and their respective properties, which may be used in accordance with this invention, are described in the following Tables IIIA and IIIB. The information set forth in Tables IIIA and IIIB was reported in technical data sheets made available by the commercial supplier (Arkema, Inc.).

TABLE IIIA

Pebax ® Polyether-amideblock copolymers

| Property | Test Method | Units | PEBAX Grade 7233 | 7033 | 6333 | 5533 |
|---|---|---|---|---|---|---|
| Hardness, durometer D | D 2240 | D | 72 | 69 | 63 | 55 |
| Flexural Modulus | D790 | psi | 107,000 | 67,000 | 49,000 | 29,000 |
| Tensile Strength, Ultimate | D 638 | psi | 9210 | 8300 | 8100 | 7300 |
| Elongation, Ultimate | D638 | % | 360 | 400 | 300 | 430 |
| Izod impact | D256 | | | | | |
| at 20 F. | | ft lb/in | 1.4 | no break | no break | no break |
| at –40 F. | | | 1.4 | 0.95 | 1.5 | no break |
| Melting point | D3418 | ° F. | 348 | 345 | 342 | 334 |
| Vicat softening point | D1525 | ° F. | 327 | 329 | 322 | 291 |
| Specific Gravity | D792 | | 1.02 | 1.02 | 1.01 | 1.01 |

TABLE IIIB

Pebax ® Polyether-amide block copolymers

| Property | Test Method | Units | PEBAX 4033 | PEBAX 3533 | PEBAX 2533 |
|---|---|---|---|---|---|
| Hardness, durometer D | D 2240 | D | 40 | 35 | 25 |
| Flexural Modulus | D790 | psi | 13,000 | 2,800 | 2,100 |
| Tensile Strength, Ultimate | D 638 | psi | 5700 | 5600 | 4950 |
| Elongation, Ultimate | D638 | % | 390 | 580 | 640 |
| Izod impact | D256 | | | | |
| at 20 F. | | ft lb/in | no break | no break | no break |
| at –40 F. | | | no break | no break | no break |
| Melting point | D3418 | ° F. | 334 | 306 | 298 |
| Vicat softening point | D1525 | ° F. | 270 | 165 | 140 |
| Specific Gravity | D792 | | 1.01 | 1.01 | 1.01 |

In a particularly preferred version, blends of polyamide polymers as described in the above-mentioned Montanari et al., U.S. Pat. No. 8,399,557 (Montanari '557), are used to form the compositions of this invention. These transparent blends (or alloys) comprise, by weight, the total being 100%:

(A) 1 to 99% of at least one constituent copolymer: exhibiting a high transparency such that the transmission at 560 nm through a sheet with a thickness of 2 mm is greater than 65%; exhibiting a glass transition temperature of at least 90° C.; and being amorphous or exhibiting a crystallinity ranging up to semicrystallinity; and comprising: (A1) amide units, including amide units produced from at least one cycloaliphatic diamine unit; and (A2) flexible ether units;

(B) 99 to 1% of at least one constituent polymer chosen from: (Ba) semicrystalline copolyamides comprising amide units (Ba1) and comprising ether units (Ba2), wherein said semicrystalline copolyamides have a glass transition temperature (Tg) of less than 65° C.; and alloys based on such copolyamides (Ba); and (C) 0 to 50% by weight of at least one polyamide, copolyamide, or copolyamide comprising ether units other than those used in (A) and (B) above; and/or of at least one additive normal for thermoplastic polymers and copolymers; the choice of the units or monomers in the composition of (A), (B) and (C) and also the choice of the proportions of the said units or of the said monomers being such that the resulting blend or alloy exhibits a high transparency such that the transmission at 560 nm through a sheet with a thickness of 2 mm is greater than 50%.

The reaction products of the above-described components (A), (B), and (C), also may be used to form a polyamide composition suitable for use in the present invention. Methods for making the components, (A), (B), and (C) also are described in the Montanari '557 Patent. For example, copolymer (A) may be prepared by charging a cycloaliphatic diamine and the diacids are charged to an 80 l autoclave. The reactor is purged with nitrogen and closed, and is heated to 260° C. under pressure and while stirring at 40 rev/min. After maintaining for one hour, the pressure is reduced to atmospheric pressure and the polyether and the catalyst are added. The reactor is placed under vacuum over 30 min to reach 50 mbar (if necessary 20 mbar). The rise in the couple lasts approximately two hours. On reaching the viscosity, the reactor is brought back to atmospheric pressure and the product is granulated and dried under vacuum at 75° C. Methods for making the blends also are described. For example, the components, (A), (B) and (C), which are in the form of granules, can be blended, this blend subsequently being injection molded at a temperature of between 230° and 330° C. on an injection-molding machine. Examples of suitable polyamide copolymers, as described in the Montanari '557 Patent, and their related properties are described in the following Table IV.

TABLE IV

Polyamide Copolymer Compositions

| Composition | Tg | Delta Hm (2) | Transmission at 560 nm | Flex Modulus | Ross-Flex | Elongation at Break | Viscosity | Yellowing |
|---|---|---|---|---|---|---|---|---|
| Polyamide A | 91° C. | 0 | 91 | 680 MPa | 50,000 | | 1.21 | 8.7 |
| Polyamide B | 85° C. | 0 | 76 | | | | | |
| Polyamide C | 112° C. | 0 | 86 | 970 MPa | | 290% | 1.21 | 0.25 |
| Polyamide D | 131° C. | 0 | 90 | 1377 MPa | | 221% | 1.21 | |

Polyamide A-polyamide copolymer made from diamine (3,3'-dimethyl-4,4'-diaminodicyclohexylmethane (BMACM) and diacid (C12(0.5)-C14(0.5)) and 25% polyether (polytetramethylene glycol[PTMG].
Polyamide B-polyamide copolymer made from diamine (BMACM) and diacid (C14(0.5)-C18(0.5)) and 23% polyether (PTMG).
Polyamide C-polyamide copolymer made from diamine (BMACM) and diacid (C12(0.5)-C14(0.5)) and 20% polyether (PTMG).
Polyamide D- polyamide copolymer made from diamine (BMACM) and diacid (C10(0.5)-C12(0.5)) and 12% polyether (PTMG).
Delta Hm (2)-It refers to the enthalpy of fusion during the second heating of a DSC according to the ISO standard, DSC being Differential Scanning Calorimetry.
Transparency: It is characterized by a measurement of light transmission at a wavelength of 560 nm through a polished sheet with a thickness of 2 mm. An amount of light transmitted expressed as percent is measured.
Flexural modulus: The flex modulus of a sample is measured either according to ISO 178 (MPa) on 80 × 10 × 4 mm bars or E' modulus obtained at 23° C. obtained during a DMA measurement.
Ross-Flex test ASTM 1052: A flat test specimen with a thickness of 2 mm, pierced by a hole with a diameter of 2.5 mm, is bent, at the level of this hole, by 90°, alternatively at −10° C., the aim being to withstand the greatest possible number of cycles without breaking.
Elongation at break (%): Tension with regard to ISOR527.
Viscosity: Intrinsic viscosity in dl/g from 0.5 g dissolved at 25° C. in metacresol.
Yellowing: it involves a measurement of Yellow Index (YI) on granules.

Glass Transition Temperature (Tg)

One advantageous property of at least some of the transparent polyamides used to form the compositions of the present invention is that they exhibit a relatively high glass transition temperature (Tg). The transparent polyamides are relatively easy to process and can be molded to form different golf ball layers. In general, the glass transition refers to the reversible transition in amorphous materials (or in the amorphous regions within semi-crystalline materials) from a hard and relatively brittle state into a rubbery state. The glass transition temperature (Tg) as reported herein is measured according to Test Method ISO 11357 and reported in degrees celsius. As the temperature of a polymer drops below Tg, it behaves in an increasingly brittle manner. As the temperature rises above the Tg, the polymer becomes more rubber-like. Thus, knowledge of Tg is an important factor in the selection of materials for golf ball layer applications. In general, values of Tg well below room temperature define the domain of elastomers and values above room temperature define rigid, structural polymers. It has been found that preferred transparent polyamides exhibit a Tg in a range of about 30 to about 170° C., and has a lower range of about 35, 40, or 50 or 60° C. and an upper range of about 70, 80, 90, 120, 140, or 150° C. In one preferred version, the Tg may be about 65, 75, 85, 91, 95 or 105° C. It is important to note that these preferred transparent polyamides may also have a second Tg that is observed at below ambient temperatures (less than 25° C.). It is believed that this sub-ambient Tg is associated with a relatively soft polyether segment; whereas, the higher temperature Tg is associated with a polyamide segment. Therefore, in one embodiment, a transparent polyamide having a reported Tg of 90° C. may or may not also exhibit a Tg at −65° C., and the like. In one embodiment, the transparent polyamide has a glass transition temperature in the range of about 75° to about 160° C., more preferably in the range of about 80° to about 95° C.

As used herein, the term, "semi-crystalline" covers (co) polyamides which have both a glass transition temperature (Tg) and a melting point as determined by DSC. The term, "amorphous" covers polyamides that do not have a melting point detected by DSC or a melting point with negligible intensity such that it does not affect the essentially amorphous nature of the polymer. The term, "semi-crystalline", as used herein, relates to polymers that have both a melting endotherm and a glass transition as determined by DSC. The term, "amorphous", as used herein, relates to polymers that have a glass transition but do not exhibit a melting endotherm as determined by DSC. The term, "quasi-amorphous", as used herein, relates to polymers that are essentially amorphous and exhibit a glass transition and a small or insignificant melting endotherm ($DH_f \leq 10$ J/g) as determined by DSC. The term, "micro-crystalline", as used herein, refers to semi-crystalline polymers in which the spherulite size is sufficiently small in order to maintain transparency.

Charpy Impact-Resistance

The transparent polyamides also have high flexibility, toughness, impact-durability and stress-crack resistance. One advantageous property of the transparent polyamides used to form the compositions of the present invention is their relatively high Charpy impact-resistance. In general, impact testing refers to the energy required to break or deform a material. The Charpy impact test is a standardized high strain-rate test which determines the amount of energy absorbed by a material during fracture. This absorbed energy is a measure of a given material's notch toughness and acts as a tool to study temperature-dependent ductile-brittle transition. The test method standard is ISO 179/1eA. Samples are conditioned for 15 days at 23° C. and 50% relative humidity. The test results herein are measured at either 23° C. or −30° C. and results are reported in kilojoules per meter squared. The higher the number, the tougher the material, with a no-break (NB) meaning that the test sample was flexible enough to withstand the impact without fracturing. High Charpy impact values are an important material property to consider when choosing a material for a layer in a golf ball, since a golf ball must withstand very high force impacts, such as those encountered when struck with a golf club. It is believed that the polyamide compositions herein comprising a transparent polyamide, preferably have a Charpy notched impact (at 23°

C.) of from at least about 8 to No-Break (NB), and have a lower range of from about 10, 12, 14, 16, 18, 25, 30, or 40 kJ/m² to an upper limit ranging from about 80, 85, 90, or 94 kJ/m² to no-break. A preferred transparent polyamide composition comprises Rilsan Clear G300 HI, which has a Charpy notched impact value at 23° C. of 94 kJ/m², and a value at −30° C. of 19 kJ/m². In one embodiment, the transparent polyamide preferably has a Charpy notched impact-resistance value of at least about 15 kJ/m², and more preferably at least about 50 kJ/m², at 23° C. In one instance, the transparent polyamide has a ratio of Charpy notched impact-resistance measured at 23° C. to Charpy notched impact-resistance measured at −30° C. of at least about 2.0, and preferably at least about 4.0. In other examples, the ratio of Charpy notched impact-resistance measured at 23° C. to Charpy notched impact-resistance measured at −30° C. is about 2.0:1, 2.5:1, 3.0:1, 3.5:1, 4.0:1, 4.5:1, 4.9:1, or greater. It is recognized that the Charpy impact-resistance may be measured at −40° C. or −30° C. depending upon testing conditions. Also, when a material is described as having a Charpy impact-resistance value of "at least about (certain value)", it is meant to define a material that has a Charpy impact-resistance value from about that certain value to a reading of "No-Break" (NB). That is, there is no upper limit value that can be measured using the Charpy test method; therefore, it is designated as No-Break.

The transparent polyamides are generally light weight (low density) and easy to process. They also have other advantageous properties such as good chemical resistance and temperature stability. In the present invention, it has been found that compositions comprising transparent polyamides may be prepared and these compositions may be molded into spheres having relatively high Coefficient of Restitutions (CORs) over a range of compressions, which are important golf ball properties as discussed further below.

Optical Effects

The transparent optical nature of the polyamide also provides benefits. In one preferred embodiment, the composition comprising the transparent polyamide is also transparent. That is, the final composition (containing the transparent polyamide and any other optional materials as described above) is optically transparent. In other instances, the final polyamide composition may be semi-transparent, translucent, or the like. The transparent, semi-transparent, or translucent composition may contain light-reflective fillers (for example, pearlescent pigments, glitter specks, color-flop pigments, edge-effect pigments, metallics, and mixtures thereof.) These fillers can enhance the visibility and ornamental effect of the golf ball.

Pearlescent pigments are particularly preferred, because these materials can provide special luster effects. Pearlescent pigment is generally made up of multiple platelet-like semi-transparent particles. When light strikes the platelets, it is partially reflected and partially transmitted through them. There are many platelet surfaces in parallel orientation and many layers of pigment at different depths within the pearlescent pigment-containing paint, coating, or other composition. As light reflects off the platelet surfaces in the different layers, this creates a pearly luster effect. A person looking at the composition will see different reflections and scattering of light depending upon their viewing angle. Some pearlescent pigments do not have a layered structure, that is, they comprise discrete particles and do not contain coated substrates. For example, metal-effect pearlescent pigments such as aluminum, copper, copper-zinc (bronze) alloys, and zinc particles may be used. Basic lead carbonate and bismuth oxychloride pigment particles also can be used. Other pearlescent pigments have a layered structure, that is, they contain a substrate. For example, natural or synthetic mica platelets may be coated with iron oxide or titanium dioxide to form special effect pearlescent pigments. Organic pigments also can be crystallized to form pigment flakes and pigments having a natural pearlescence such as pigment suspensions derived from fish scales may be used.

Metallics, particularly metalized films and foils, and glitter specks, which comprise very small plastic pieces painted in metallic, neon, and iridescent colors to reflect light also can be used as reflective fillers in accordance with this invention. Any suitable metal, especially highly lustrous metals, may be used and these metallics can be in the form of flakes, particles, and the like.

Titanium dioxide pigment is preferably used as light-reflective filler, because of its light scattering properties including reflectivity and refraction. As the light strikes the surface of the composition, most of the light will be reflected because of the titanium dioxide pigment concentration. The light strikes the surface of the pigment (which has a relatively high refractive index in contrast to the binder resin), the light is bent and reflected outwardly. The portion of light which is not reflected will pass through the particles and will be bent in different direction. Other useful metal (or metal alloy) flakes, plates, powders, or particles may include bismuth boron, brass, bronze, cobalt, copper, nickel, chrome, iron, molybdenum, nickel powder, stainless steel, zirconium aluminum, tungsten metal, beryllium metal, zinc, or tin. Other metal oxides may include zinc oxide, iron oxide, aluminum oxide, magnesium oxide, zirconium oxide, and tungsten trioxide also may be suitable.

In other instances, the substantially transparent polymeric matrices may be lightly colored or tinted. For example, a relatively small amount of colored pigments such as blue, green, red, or yellow pigments or the like may be blended in the polymeric matrices to impart some color to the composite and cover layers. Suitable pigments include nickel and chrome titanates, chrome yellow, cadmium types, carbon black, chrome oxide green types, phthalocyanine blue or green, perylene and quinacridone types, and other conventional pigments. Pigment extenders include, for example, barytes, heavy spar, microtalc, kaolin, micaceous iron oxide, magnesium mica, quartz flour, powdered slate, and silicon carbide. Color-flop pigments, as disclosed in Ohira et al, U.S. Pat. Nos. 7,018,307 and 6,558,277, which show a change in color as the viewing angle changes may be used in accordance with the present invention. Edge-effect pigments, which are attracted to the edges or sharper contours of the surfaces to which they are applied, also may be used.

Likewise, if a fluorescent effect is desired, a relatively small amount of fluorescent dye may be added to the transparent polyamide composition. Suitable fluorescent dyes include, for example, dyes from the thioxanthene, xanthene, perylene, perylene imide, coumarin, thioindigoid, naphthalimide and methine dye classes. Representative yellow fluorescent dye examples include, but are not limited to: Lumogen F Orange™ 240 (BASF, Rensselaer, N.Y.); Lumogen F Yellow™ 083 (BASF, Rensselaer, N.Y.); Hostasol Yellow™ 3G (Hoechst-Celanese, Somerville, N.J.); Oraset Yellow™ 8GF (Ciba-Geigy, Hawthorne, N.Y.); Fluorol 088™ (BASF, Rensselaer, N.Y.); Thermoplast F Yellow™ 084 (BASF, Rensselaer, N.Y.); Golden Yellow™ D-304 (DayGlo, Cleveland, Ohio); Mohawk Yellow™ D-299 (DayGlo, Cleveland, Ohio); Potomac Yellow™ D-838 (DayGlo, Cleveland, Ohio) and Polyfast Brilliant Red™ SB (Keystone, Chicago, Ill.) Conventional non-fluorescent dyes also may be used including, but not limited to, azo, heterocyclic azo, anthraquinone, benzodifuranone, polycyclic aromatic carbonyl, indigoid, polymethine, styryl, di- and tri-aryl carbonium, phthalocyanines, quinopphthalones, sulfur, nitro and nitroso, stilbene, and formazan dyes.

Optical brighteners, which typically emit a bluish light, also may be added to the polyamide compositions. In general, optical brighteners absorb the invisible ultra-violet portion of the daylight spectrum and convert this energy into the longer-wavelength visible portion of the spectrum. Suitable optical brighteners include, for example, stilbene derivatives, styryl derivatives of benzene and biphenyl, bis(benzazol-2-yl) derivatives, coumarins, carbostyrils, naphthalimides, derivatives of dibenzothiophene-5,5-dioxide, pyrene derivatives, and pyridotriazoles. In accordance with the present invention, any of these or other known optical brighteners including derivatives of 4,4'-diamino stilbene-2,2'-disulfonic acid, 4-methyl-7-diethylamino coumarin and 2,5-bis(5-tert-butyl)-2-benzoxazolyl)thiophene.

Acid Anhydride-Modified Polyolefins

The polyamide compositions of this invention may further contain acid anhydride-modified polyolefins. Adding the acid anhydride-modified polyolefin helps improve the toughness and impact durability of the composition. In such materials, the polyolefin polymer is chemically modified with acid anhydride. That is, the polyolefin polymer is functionalized; it contains at least one acid anhydride group. In general, such acid anhydride groups may be grafted onto the polyolefin polymer backbone. Some examples of suitable acid anhydrides that may be used to functionalize the polyolefin include, but are not limited to, fumaric, nadic, itaconic, and clorendic anhydrides, and their substituted derivatives thereof.

Suitable olefin monomeric units that can be used to prepare the polyolefin polymer include, for example, ethylene, propylene, butene, hexene, heptene, octene, decene, and dodecene. Preferably, the monomeric unit contains from 2 to about 20 carbon atoms. The resulting polyolefin chains (polymer backbones) formed from these monomeric units include, for example, polyethylene, high density polyethylene (HDPE), low density polyethylene (LDPE), very low density polyethylene (VLDPE), polypropylene, polybutene, polyhexene, polyoctene, polydecene, and polydodecene, and copolymers and blends thereof. The resulting polyolefin polymer is functionalized with at least one acid anhydride moiety.

More particularly, the acid anhydride-modified polyolefin polymers used in this invention include copolymers such as, for example, ethylene-based copolymers, particularly ethylene-propylene (EP); ethylene-butene (EB); ethylene-hexene (EH); ethylene-octene (EO); styrene-ethylene/butylene-styrene (SEBS); ethylene-propylene diene monomer (EPDM); ethylene-vinyl acetate (EVA); and various ethylene-alkyl acrylate and ethylene-alkyl alkyl acrylate copolymers such as, for example, ethylene-methyl acrylate (EMA); ethylene-ethyl acrylate (EEA); ethylene-propyl acrylate (EPA); ethylene n-butyl acrylate (EBA) copolymers; and the like. Other polyolefin-based copolymers such as polypropylene and polybutene-based copolymers also can be used. These copolymers include random, block, and graft copolymers which have been functionalized with acid anhydride groups.

Examples of commercially-available acid anhydride polyolefins that can be used in accordance with this invention, include, but are not limited to, Amplify™ GR functional polymers, available from the Dow Chemical Company; Fusabond® polymers, available from the DuPont Company; Kraton® FG and RP polymers, available from Kraton Polymers LLC; Lotader® polymers available from Arkema, Inc.; Polybond® and Royaltuf® polymers, available from Chemtura Corp.; and Exxelor polymers available from the ExxonMobil Corp.

Plasticizers

The polyamide compositions of this invention may further contain a plasticizer. Adding the plasticizers to the composition helps to reduce the glass transition temperature (Tg) of the composition. The glass transition in a polymer is a temperature range below which a polymer is relatively brittle and above which it is rubber-like. In addition to lowering the Tg, the plasticizer may also reduce the tan δ in the temperature range above the Tg. A polymer's Tg is measured by a Differential Scanning calorimeter or a Dynamic Mechanical Analyzer (DMA) and the DMA is used to measure tan δ. The plasticizer may also reduce the hardness and compression of the composition when compared to its non-plasticized condition. The effects of adding a plasticizer to the polyamide composition on Tg, flex modulus, hardness, and other physical properties are discussed further below.

The polyamide compositions may contain one or more plasticizers. The plasticizers that may be used in the polyamide compositions of this invention include, for example, N-butylbenzenesulfonamide (BBSA); N-ethylbenzenesulfonamide (EBSA); N-propylbenzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl)phosphate.

In one preferred version, the plasticizer is selected from the group of polytetramethylene ether glycol (available from BASF under the tradename, PolyTHF™ 250); propylene carbonate (available from Huntsman Corp., under the tradename, Jeffsol™ PC); and/or dipropyleneglycol dibenzoate (available from Eastman Chemical under the tradename, Benzoflex™ 284). Mixtures of these plasticizers also may be used.

Other suitable plasticizer compounds include benzene mono-, di-, and tricarboxylic acid esters. Phthalates such as Bis(2-ethylhexyl)phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate are suitable. Iso- and terephthalates such as Dioctyl terephthalate and Dinonyl isophthalate may be used. Also appropriate are trimellitates such as Trimethyl trimellitate (TMTM), Tri-(2-ethylhexyl)trimellitate (TOTM), Tri-(n-octyl,n-decyl)trimellitate, Tri-(heptyl,nonyl)trimellitate, Tri-n-octyl trimellitate; as well as benzoates, including: 2-ethylhexyl-4-hydroxy benzoate, n-octyl benzoate, methyl benzoate, and ethyl benzoate.

Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS). Also, esters based on glycols, polyglycols and polyhydric alcohols such as poly(ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate may be used.

Fatty acids, fatty acid salts, fatty acid amides, and fatty acid esters also may be used in the compositions of this invention Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate.

Glycerol-based esters such as soy-bean, tung, or linseed oils or their epoxidized derivatives can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as Tricresyl phosphate (TCP), Tributyl phosphate (TBP), alkyl sulfonic acid phenyl esters (ASE); and sulfonamides such as N-ethyl toluene sulfonamide, N-(2-hydroxypropyl)benzene sulfonamide, N-(n-butyl) benzene sulfonamide. Furthermore, thioester and thioether variants of the plasticizer compounds mentioned above are suitable.

Non-ester plasticizers such as alcohols, polyhydric alcohols, glycols, polyglycols, and polyethers are suitable materials for plasticization. Materials such as polytetramethylene ether glycol, poly(ethylene glycol), and poly(propylene glycol), oleyl alcohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of polyamide plasticizers that may be used in the composition of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

Jacques et al., U.S. Pat. No. 7,045,185, the disclosure of which is hereby incorporated by reference, discloses sulphonamides such as N-butylbenzenesulphonamide, ethyltoluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers also may be used.

Sulfonamides are particularly preferred plasticizers fur use in the present invention, and these materials are described in Fish, Jr. et al., U.S. Pat. No. 7,297,737, the disclosure of which is hereby incorporated by reference. Examples of such sulfonamides include N-alkyl benzenesulfonamides and toluenesufonamides, particularly N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., US Patent Application Publication 2010/0183837, the disclosure of which is hereby incorporated by reference. The polyamide compositions containing plasticizer, as described in the above patent references, also may be used in this invention.

It is believed that the plasticizer should be added in a sufficient amount to the polyamide composition so there is a substantial change in the stiffness and/or hardness of the polyamide polymer. Thus, although the concentration of plasticizer may be as little as 1% by weight to form some polyamide compositions per this invention, it is preferred that the concentration be relatively greater. For example, it is preferred that the concentration of plasticizer be at least 3 wt. %. More particularly, it is preferred that the plasticizer be present in an amount within a range having a lower limit of 1% or 3% or 5% or 7% or 8% or 10% or 12% or 15% or 18% and an upper limit of 20% or 22% or 25% or 30% or 35% or 40% or 42% or 50% or 55% or 60% or 66% or 71% or 75% or 80%. In one preferred embodiment, the concentration of plasticizer falls within the range of about 7% to about 75%, preferably about 9% to about 55%, and more preferably about 15% to about 50%.

It is believed that adding the plasticizer to the polyamide helps reduce the glass transition temperature (Tg) of the composition. Thus, in one embodiment, the first polyamide (containing polyamide only) composition has a first Tg value and the second polyamide (containing polyamide and plasticizer) composition has a second Tg value, wherein the Tg value is at least 1% less; or at least 2% less; or at least 4% less; or at least 8% less; or at least 10% less than the Tg value. It is believed that adding the plasticizer to the polyamide helps make the composition softer and more rubbery (although the polyamide/plasticizer composition is still considered relatively stiff versus the rubber composition used to make a core layer as discussed further below.)

Adding the plasticizers to the composition also helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures.

Thus, in one embodiment, the first polyamide (containing polyamide only) composition has a first flex modulus value and the second polyamide (containing polyamide and plasticizer) composition has a second flex modulus value, wherein the second flex modulus value is at least 1% less; or at least 2% less; or at least 4% less; or at least 8% less; or at least 10% less than the first modulus value. More particularly, in one embodiment, the polyamide/plasticizer composition has a flex modulus lower limit of 10,000 or 20,000 or 40,000 or 50,000 or 60,000 or 70,000 or 80,000 or 90,000 or 100,000; and a flex modulus upper limit of 110,000 or 120,000 or 130,000 psi or 140,000 or 160,000 or 180,000 or 200,000 or 300,000 or 400,000 or 500,000 psi or greater. In general, the properties of flex modulus and hardness are related, whereby flex modulus measures the material's resistance to bending, and hardness measures the material's resistance to indentation. In general, as the flex modulus of the material decreases, the hardness of the material also decreases.

As discussed above, adding the plasticizer to the polyamide helps reduce the flex modulus of the composition and it also helps reduce the hardness to a certain degree. Thus, in one embodiment, the polyamide/plasticizer composition is relatively soft and having a hardness of no greater than 40 Shore D. For example, the Shore D hardness may be within a range having a lower limit of 15 or 18 or 20 or 0r 22 or 24 and an upper limit of 28 or 30 or 32 or 34 or 35 or 38 or 40 Shore D. In other embodiments, the polyamide/plasticizer composition is moderately soft having a hardness of no greater than about 60 Shore D. For example, the Shore D hardness may be within a range having a lower limit of 25, 28, 20, 32, 35, 36, 38, or 40, and an upper limit of 42, 45, 48, 50, 54, 56, or 60. In yet other embodiments, the polyamide/plasticizer composition is moderately hard having a hardness in the range of about 42, 44, 47, 51, 53, or 58 and an upper limit of about 60, 65, 72, 77, 80, 84, 88, 91, or 95 Shore D.

Additionally, adding plasticizers to the polyamide composition generally helps to reduce the compression and/or increase the CoR of the composition when tested as a solid sphere and compared to an unplasticized composition. Plasticized polyamide compositions typically show compression values lower, or at most equal to, unplasticized compositions while displaying an increase of CoR. In some instances plasticization of the composition might produce a slight reduction in the CoR while at the same time reducing the compression to a greater extent, thereby providing an overall improvement to the compression/CoR relationship over the unplasticized composition.

Any of the polyamide-comprising compositions herein may be blended with any number of additional polymers to form the core or cover layer of the invention herein. Such polymers include, for example, polyurethanes; polyureas; copolymers, blends and hybrids of polyurethane and polyurea; ethylene acid copolymer ionomer resins (for example, Surlyn® ionomer resins and HPF 1000 and HPF 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth) acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. The tranparent polyamide may also be blended with rubbery elastomers in accordance with this invention. Such elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, alkyl acrylate rubber, chlorinated isoprene rubber, acrylonitrile chlorinated isoprene rubber, and combinations of two or more thereof.

Figure 3:
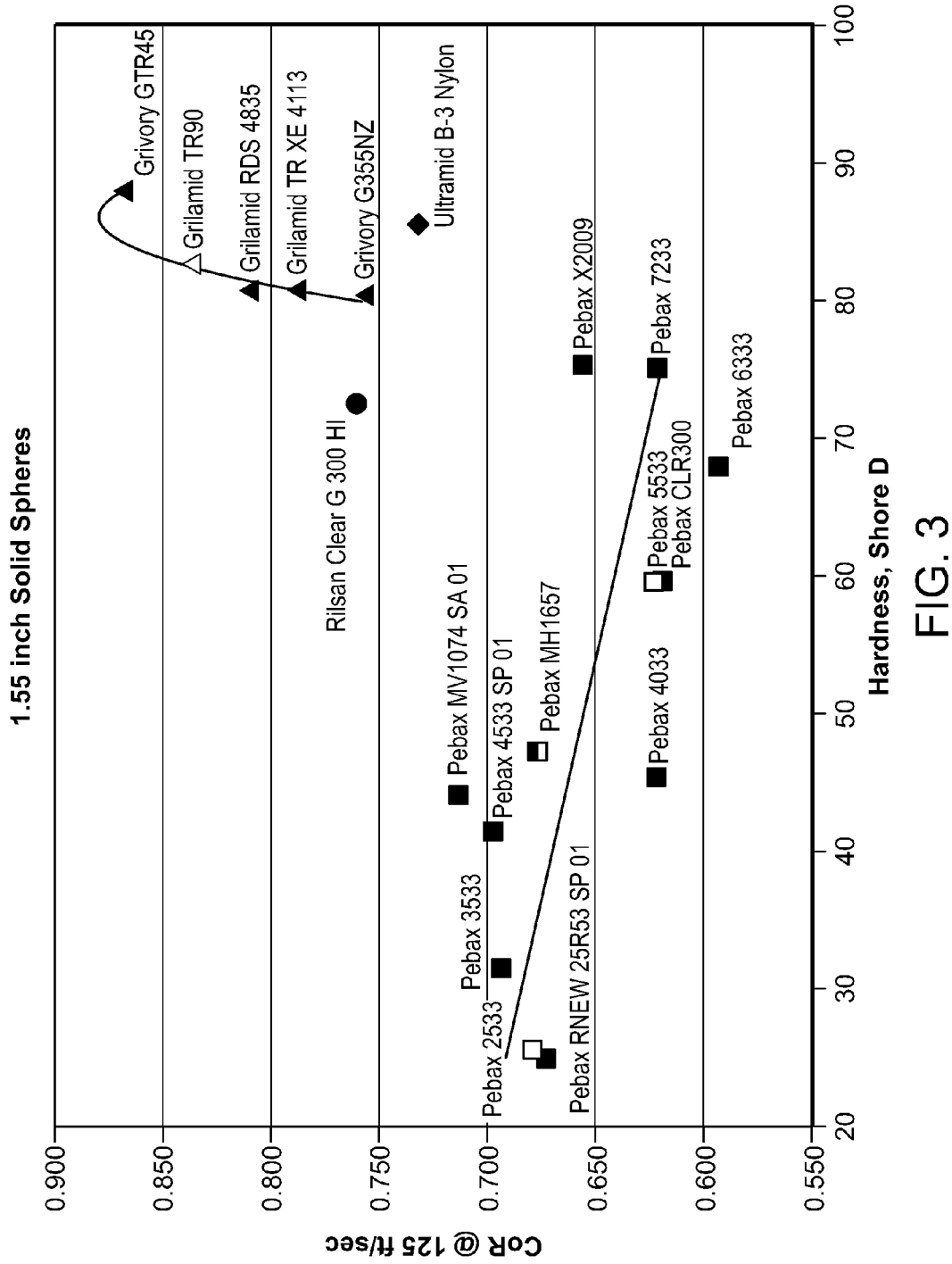
FIG. 3 is a graph showing the Coefficient of Restitution (COR) of sample polyamide materials plotted against the Hardness of the samples.

Examples of solid spheres made from polyamides compositions and other polymer compositions and their respective properties, which may be used in accordance with this invention, are described in the following Table V. In the Examples provided in Table V, solid spheres (1.55 inch diameter) were formed by combining various compositions in an injection molding machine, or first in a twin screw extruder. The relative amounts of each component used are reported in weight %, based on the total weight of the composition. The spheres were conditioned for two weeks at 23° C. and 50% RH after molding before they were measured. By the term, "molded sphere", as used herein, it is meant a solid sphere (1.55 inch diameter) formed and conditioned in the above-described manner. The COR, compression, and hardness of the spheres are reported in Table V. Referring to FIG. 3, a graph showing the Coefficient of Restitution (COR) of the Sphere Samples in Table V plotted against the Hardness of these Samples is provided in Table V.

In Table V, the following polyamides are particularly preferred because of their transparent optical nature: Grilamid TR90; Grivory GTR45; Rilsan Clear G 300HI; Pebax CLR300; and Grilamid TR XE 4113.

TABLE V

Spheres Made from Polyamide Compositions and Other Polymer Compositions

| 1$^{st}$ Ingredient | % | 2nd Ingredient | % | 3rd Ingredient | % | CoR @125 | Atti | Shore D | Shore C |
|---|---|---|---|---|---|---|---|---|---|
| *Grilamid TR90 | 50 | Fusabond N525 | 50 | | | 0.663 | 125 | 59.6 | 87.1 |
| *Grilamid TR90 | 50 | HPF2000 | 50 | | | broke | 159 | 71.7 | 99.1 |
| *Grilamid TR90 | 50 | Hytrel 3078 | 50 | | | 0.679 | 126 | 59.5 | 89.4 |
| *Grilamid TR90 | 50 | Pebax 2533 | 50 | | | 0.664 | 109 | 50.9 | 80.3 |
| *Grivory GTR45 | 50 | Fusabond N525 | 50 | | | 0.633 | 105 | 56.2 | 81.1 |
| *Grivory GTR45 | 90 | Fusabond N525 | 10 | | | 0.784 | 182 | 81.8 | 100 |

TABLE V-continued

Spheres Made from Polyamide Compositions and Other Polymer Compositions

| 1st Ingredient | % | 2nd Ingredient | % | 3rd Ingredient | % | CoR @125 | Atti | Shore D | Shore C |
|---|---|---|---|---|---|---|---|---|---|
| *Grivory GTR45 | 67 | NBR 6300 | 33 | | | 0.664 | 176 | 74.5 | 99.9 |
| *HPF 2000 | 90 | Grivory GTR45 | 10 | | | 0.836 | 93 | 52.0 | 80.4 |
| *HPF 2000 | 80 | Grivory GTR45 | 20 | | | 0.818 | 107 | 54.7 | 83.7 |
| *HPF 2000 | 70 | Grivory GTR45 | 30 | | | 0.798 | 117 | 56.6 | 86.6 |
| *HPF 2000 | 60 | Grivory GTR45 | 40 | | | 0.773 | 131 | 59.5 | 90.2 |
| HPF 2000 | 75 | Pebax 2533 | 25 | | | 0.822 | 66 | 44.2 | 70.3 |
| HPF 2000 | 50 | Pebax 2533 | 50 | | | 0.774 | 41 | 36.7 | 61.4 |
| HPF 2000 | 25 | Pebax 2533 | 75 | | | 0.718 | 4 | 28.5 | 50.0 |
| HPF 2000 | 90 | Pebax X2009 | 10 | | | broke | broke | 51.6 | 78.6 |
| HPF 2000 | 80 | Pebax X2009 | 20 | | | broke | 104 | 52.2 | 80.3 |
| HPF 2000 | 50 | Grilamid RDS 4835 | 50 | | | broke | 145 | 67.5 | 95.7 |
| *Surlyn 9320 | 50 | Grivory GTR 45 | 40 | Zinc Stearate | 10 | 0.610 | 125 | 56.9 | 87.1 |
| Pebax 2533 | 100 | | | | | 0.679 | −36 | 25.7 | 44.6 |
| *Grilamid TR90 | 100 | | | | | 0.836 | 179 | 82.7 | — |
| Grilamid RDS 4835 | 100 | | | | | 0.810 | 175 | 80.8 | 100 |
| *Grivory GTR45 | 100 | | | | | 0.867 | 184 | 88.0 | 100 |
| Pebax X2009 | 100 | | | | | 0.655 | 175 | 75.4 | 99.3 |
| *Rilsan Clear G 300 HI | 100 | | | | | 0.760 | 169 | 72.6 | 99.0 |
| HPF2000 | 100 | | | | | 0.857 | 85 | 77.6 | 47.5 |
| Surlyn 9320 | 100 | | | | | 0.559 | 37 | 62.1 | 37.2 |
| Fusabond N525 | 100 | | | | | 0.670 | −45 | 41.6 | 26.0 |
| Hytrel 3078 | 100 | | | | | 0.721 | −10 | 52.3 | 29.9 |
| Pebax 3533 | 100 | | | | | 0.693 | 14 | 31.6 | 53.9 |
| Pebax 5533 | 100 | | | | | 0.622 | 123 | 59.7 | 84.4 |
| Pebax 4033 | 100 | | | | | 0.621 | 79 | 45.5 | 71.3 |
| Pebax 6333 | 100 | | | | | 0.592 | 148 | 68.1 | 92.6 |
| Pebax 7233 | 100 | | | | | 0.620 | 172 | 75.2 | 98.9 |
| *Pebax CLR300 | 100 | | | | | 0.618 | 141 | 59.8 | 88.0 |
| Pebax RNEW 25R53 SP 01 | 100 | | | | | 0.673 | −24* | 25.1 | 44.6 |
| Pebax 4533 SP 01 | 100 | | | | | 0.697 | 83* | 41.5 | 71.6 |
| Pebax MV1074 SA 01 | 100 | | | | | 0.713 | 95 | 44.2 | 75.3 |
| Pebax MH1657 | 100 | | | | | 0.676 | 91 | 47.4 | 73.9 |
| Grivory G355NZ | 100 | | | | | 0.756 | 180 | 80.5 | 100 |
| *Grilamid TR XE 4113 | 100 | | | | | 0.788 | 176 | 80.8 | 100 |
| Grivory RDS 4836 Nat. | 100 | | | | | broke | 178 | 84.7 | 100 |
| Nyconomer 973 | 100 | | | | | broke | 156 | 67.8 | 92.2 |
| Polyamide 12 | 100 | | | | | broke | 178 | 76.7 | 100 |
| Ultramid B-3 Nylon | 100 | | | | | 0.732 | 186 | 85.6 | 100 |

* calculated from DCM compression

*Compositions containing transparent polyamides.

Grilamid TR 90, RDS 4835, TR XE 4113, Grivory GTR 45, RDS 4836 Nat, and G355 NZ are all available from EMS-Chemie (Switzerland). The TR, G, and GTR grades are transparent.

Pebax 2533, 3533, 3033, 5533, X2009, 6333, 7233, CLR 300, RNEW 25R53 SP01, 4533 SP01, MV1074 SA 01, and MH 1657 are all available from Arkema (King of Prussia, PA).

Surlyn 9320 is a VLMI ionomer available from DuPont (Wilmington DE).

Fusabond N525 is a maleic anhydride modified polyolefin available from DuPont.

Hytrel 3078 is a polyether-ester block copolymer available from DuPont.

HPF 2000 is an ionomer resin available from DuPont.

Ultramid B-3 is a Nylon 6 available from the BASF Corp (US offices in Florham Park, NJ).

Nyconomer 973 is a Nylon available from NYCOA (Manchester, NH).

NBR 6300 is an acrylonitrile-butadiene rubber (30% acrylonitrile content) partitioned with calcium carbonate available from Alpha Plastic Chemicals (UK).

TABLE VA

Spheres Made from Polyamide/Plasticizer Compositions

| 1st Ingredient | % | 2nd Ingredient | % | CoR @125 ft/s | Compression (DCM) | Shore D Hardness | Shore C Hardness |
|---|---|---|---|---|---|---|---|
| Pebax 4033 | 90 | Ethyl Oleate | 10 | 0.637 | 62 | 35.1 | 62.8 |
| Pebax 4033 | 100 | | | 0.623 | 89 | 40.9 | 69.0 |

As shown in the above Tables V and VA, various polyamide compositions may be made in accordance with this invention. The composition may optionally contain an acid anhydride-modified polyolefin, plasticizer, fatty acid salt, fatty acid amide, fatty acid ester, and mixtures thereof. The resulting polyamide composition may be used to prepare a golf ball component (for example, core, casing, intermediate, or cover layer) having several advantageous properties.

As noted above, it is significant that a blend comprising transparent polyamide and acid anhydride-modified polyolefin may be prepared and the resulting composition has excellent properties, particularly suitable for making golf ball layers. For example, as shown in Table V, a blend of 90% Grivory™ GTR45 transparent polyamide and 10% Fusabond™ N525 acid anhydride-modified polyolefin may be prepared and the resulting composition (solid, transparent sphere) has a COR of 0.784, Atti Compression of 182, and Shore D surface hardness of 81.8. In another example, a blend of 50% Grivory™ GTR45 transparent polyamide and 50% Fusabond™ N525 acid anhydride-modified polyolefin may be prepared and the resulting composition (solid, transparent sphere) has a COR of 0.633, Atti Compression of 105, and Shore D surface hardness of 56.2.

As also noted above, it is significant that a blend comprising transparent polyamide and plasticizer may be prepared and the resulting composition has excellent properties, particularly suitable for making golf ball layers. For example, as shown in Table V, a blend of 90% Pebax 4033 polyamide and 10% Ethyl Oleate (plasticizer) may be prepared and the resulting composition (solid, transparent sphere) has a COR of 0.637, DCM Compression of 62, and Shore D surface hardness of 35.1.

In other embodiments, it is not necessary for the polyamide to be blended with an acid anhydride-modified polyolefin or any other polymer or non-polymer material. That is, the composition may consist entirely of the transparent polyamide (that is, 100% by weight polyamide). In other instances, the composition may consist essentially of the transparent polyamide (for example, 97 to 100% by weight polyamide). Such polyamide compositions may contain other ingredients that do not materially affect the basic and novel characteristics of the composition. For example, mineral fillers may be added as discussed further below. In one particular version, the composition consists essentially of transparent polyether-amide block copolymer such as the above-mentioned Rilsan G300 HI, Pebax Clear 300, or Pebax Clear 400 (Arkema, Inc.).

For example, as shown in Table V, a composition consisting of 100% Rilsan G300 HI transparent copolyamide may be prepared and the resulting solid, transparent sphere has a COR of 0.760, Atti Compression of 169, and Shore D surface hardness of 72.6.

In general, the spheres made from the compositions comprising the transparent polyamides have relatively high Coefficient of Restitution (COR) values at given compression and hardness values. In one embodiment, the molded sphere comprising the polyamide composition has a COR of at least about 0.700, preferably at least about 0.750; an Atti Compression of at least about 90, preferably at least about 150; and Shore D surface hardness of about 60 to about 95, preferably about 65 to about 80.

It should be understood the golf ball materials, compositions, constructions, products, and methods for making the golf balls described and illustrated herein represent only some embodiments of the invention. Other compositions, constructions, and products can be made in accordance with this invention.

Flex Modulus and Hardness of Composition

As discussed above, the polyamide composition may be used to form an outer core and a rubber composition may be used to form an inner core. In one embodiment, a relatively stiff polyamide composition that does not contain any plasticizer is used, while the rubber composition is relatively flexible. That is, in one embodiment, the flex modulus and hardness of the polyamide material is greater than the flex modulus and hardness of the rubber material.

More particularly, in one embodiment, the polyamide composition has a flex modulus lower limit of 20,000 or 30,000 or 40,000 or 50,000 or 60,000 or 70,000 or 80,000 or 90,000 or 100,000; and a flex modulus upper limit of 110,000 or 120,000 or 130,000 psi or 140,000 or 160,000 or 180,000 or 200,000 or 300,000 or 400,000 or 500,000 psi or greater. In general, the properties of flex modulus and hardness are related, whereby flex modulus measures the material's resistance to bending and hardness measures the material's resistance to indentation. In general, as the flex modulus of the material increases, the hardness of the material also increases. Thus, in one embodiment, the polyamide composition is relatively hard having a hardness of 40 Shore D or greater, or 50 Shore D or greater, or 60 Shore D or greater, or within a range having a lower limit of 20 or 30 or 40 or 50 or 60 Shore D and an upper limit of 70 or 80 or 90 or 100 Shore D.

Conversely, in one preferred version, the rubber composition is relatively flexible. More particularly, in one embodiment, the rubber composition has a flex modulus lower limit of 1,000 or 5,000 or 10,000 or 10,000 or 15,000 or 20,000 or 25,000 or 30,000 psi and an upper limit of 40,000 or 45,000 or 50,000 or 60,000 or 70,000 or 80,000 psi. As discussed above, the hardness and flex modulus of the material are generally related and as the hardness of the material decreases, the flex modulus of the material also decreases. Thus, in one embodiment, the rubber composition has a hardness of 30 Shore D or less; or 40 Shore D or less; or 50 Shore D or less; or 60 Shore D or less. In another embodiment, the hardness of the rubber composition falls within a range having a lower limit of 15 or 30 or 40 or 50 Shore D and an upper limit of 60 or 70 or 80 or 85 Shore D.

The flexural modulus can be determined in accordance with ASTM D790 standard among other testing procedures. In some instances, it may be more feasible to measure the hardness of the golf ball layer (that is, "hardness on the ball"), and this test method also is described below.

Additives and Fillers

A wide variety of additives and fillers may be included in the final polyamide composition. Suitable additives and mineral fillers include, for example, precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium dioxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

Other additives and fillers include, but are not limited to, chemical blowing and foaming agents, optical brighteners, coloring agents, fluorescent agents, whitening agents, ultraviolet (UV) light absorbers, UV light stabilizers, defoaming agents, processing aids, antioxidants, stabilizers, softening agents, fragrance components, plasticizers, and impact modifiers. In a particular embodiment, the total amount of additive(s) and filler(s) present in the polyamide composition is 25 wt. % or less, 20 wt. % or less, 15 wt. % or less, or 12 wt. % or less, or 10 wt. % or less, or 9 wt. % or less, or 6 wt. % or less, or 5 wt. % or less, or 4 wt. % or less, or 3 wt. % or less, based on the total weight of the polyamide composition. More particularly, the polyamide composition may include filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Organic fiber micropulp also may be added. Polyamide-clay nanocomposites such as an amorphous polyamide resin containing a clay material uniformly dispersed therein, as disclosed in Lan et al., U.S. Pat. No. 6,376,591 also may be used in the polyamide composition. In another version, the polyamide compositions may contain carbon fibers or carbon fiber sheets comprising a weave of thin carbon fibers held together in a resin.

Core Structure

As discussed above, the core is preferably a dual-core comprising an inner core (center) made from a rubber composition and a surrounding outer core layer made from the polyamide composition of this invention. Single-layered cores made of the polyamide compositions also may be used in the golf ball construction.

Any suitable rubber composition known in the art may be used to make the inner core (center) of the ball in accordance with this invention. In general, such rubber compositions contain a base rubber, free-radical initiators, crosslinking agents, and filler. Suitable base rubbers include, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc. of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butylperoxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include fillers, which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Preferably, the base rubber material is polybutadiene rubber, and this material may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The rubber compositions also preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA).

In one version, the surface hardness of the outer core layer (polyamide/acid anhydride-modified polyolefin is greater than the center hardness of the inner core (rubber composition). That is, the core structure has a "positive" hardness gradient as discussed further below. Preferably, the inner core has a center hardness (CH) within a range having a lower limit of 15 or 25 or 30 or 35 or 40 or 45 or 50 or 55 Shore D and an upper limit of 60 or 65 or 70 or 75 or 80 or 85 or 90 Shore D. The center hardness in Shore C has a lower limit of 20, 30, 40, or 50 and an upper limit of 60, 70, 80, 90 or 95. The inner core (center) also preferably has a surface hardness (ICSH) within a range having a lower limit of 15 or 20 or 30 or 35 or 40 or 45 or 50 or 55 Shore D and an upper limit of 60 or 65 or 70 or 75 or 80 or 85 or 90 Shore D. Meanwhile, the outer core layer preferably has a surface hardness (OCLSH) within a range having a lower limit of 40 or 45 or 50 or 55 Shore D and an upper limit of 60 or 65 or 70 or 75 or 80 or 85 or 90 Shore D. The outer core layer hardness in Shore C has a lower limit of 20, 30, 40, or 50 and an upper limit of 60, 70, 80, 90 or 95. In an alternative version, the polyamide/acid anhydride-modified polyolefin composition is used to form the inner core, while the rubber composition is used to form the outer core. In one instance, the surface hardness of the outer core layer (rubber-containing) is greater than the center hardness of the inner core (polyamide-containing). That is, the core structure has a positive hardness gradient as discussed further below. In another instance, the center hardness of the inner core (polyamide-containing) is greater than the surface hardness of the outer core layer (rubber-containing). That is, the core structure has a "negative' hardness gradient as discussed further below.

Particularly, in one preferred instance, the center hardness of the inner core is in the range of about 15 to about 82 Shore D and the surface hardness of the outer core is in the range of about 40 to about 87 Shore D. More preferably, the center hardness of the inner core is about 15 Shore D or greater and the surface hardness of the outer core is about 50 Shore D or greater. In these instances, the surface hardness (outer core) is preferably at least 5 Shore D greater than the center hardness (inner core).

As discussed above, in another instance, the center hardness of the inner core is greater than the surface hardness of the outer core layer. For example, the center hardness may be about 50 Shore D units or greater and the surface hardness of the outer core may be about 15 Shore D units or greater. In these instances, the center hardness (inner core) is preferably at least 5 Shore D units greater than the surface hardness (outer core).

In one preferred golf ball, the inner core (center) has a "positive" hardness gradient (that is, the outer surface of the inner core is harder than its geometric center) and the outer core layer has a "positive" hardness gradient (that is, the outer surface of the outer core layer is harder than the inner surface of the outer core layer.) In cases where both the inner core and outer core layer have "positive" hardness gradients, the outer surface hardness of the outer core layer is still preferably greater than the material hardness of the inner core (center).

In another version, the inner core (center) has a positive hardness gradient, while the outer core layer has a "negative" hardness gradient (that is, the outer surface of the outer core layer is softer than the inner surface of the outer core layer.) In yet another version, the outer core layer may have a "zero" hardness gradient. (That is, the hardness values of the outer surface of the outer core layer and the inner surface of the outer core layer are substantially the same.) Particularly, the term, "zero hardness gradient" as used herein, means a surface to center (or second surface) Shore C hardness gradient of less than 8, preferably less than 5 and most preferably less than 3 and may have a value of zero or negative 1 to negative 25. The term, "negative hardness gradient" as used herein, means a surface to center (or second surface) Shore C hardness gradient of less than zero. The terms, "zero hardness gradient" and "negative hardness gradient," may be used herein interchangeably to refer to hardness gradients of negative 1 to negative 25. The term, "positive hardness gradient" as used herein, means a surface to center (or second surface) Shore C hardness gradient of 8 or greater, preferably 10 or greater, and most preferably 20 or greater. By the term, "steep positive hardness gradient" as used herein, it is meant surface to center (or second surface) Shore C hardness gradient of 20 or greater, more preferably 25 or greater, and most preferably 30 or greater. For example, the core may have a steep positive hardness gradient of 35, 40, or 45 Shore C or greater.

In one particular version, the hardness gradient from the geometric center of the inner core to the surface of the outer core layer is a positive hardness gradient. That is, the outer surface of the outer core layer is harder than the center of the inner core. Methods for measuring the hardness of the core and cover layers and determining the hardness gradients are discussed in further detail below.

As discussed above, the dual-core constitutes an inner core (center) and an outer core layer. The inner core preferably has a diameter within a range having a lower limit of 0.125 or 0.130 or 0.140 or 0.150 or 0.20 or 0.40 or 0.80 inches and an upper limit of 1.125 or 1.20 or 1.40 or 1.50 or 1.55 inches. More preferably, the inner core has a diameter in the range of about 0.125 to about 1.50 inches. The outer core preferably has a thickness within a range having a lower limit of 0.010 or 0.020 or 0.025 or 0.030 or 0.035 or 0.040 inches and an upper limit of 0.070 or 0.080 or 0.090 or 0.100 or 0.120 or 0.140 or 0.300 or 0.400 or 0.500 or 0.600 or 0.700 inches. Particularly, the outer core layer may have a thickness in the range of about 0.010 to about 0.570 inches and more preferably in the range of about 0.020 to about 0.280 inches. In other embodiments, particularly when the polyamide composition is used to form the inner core, the inner core may be smaller. For example, the inner core may have a diameter in the range of about 0.050 to about 1.40 inches, more preferably about 0.100 to about 0.700 inches. In such cases, the outer core layer may have a thickness in the range of about 0.020 to about 0.650 inches. The outer core layer encloses the inner core such that the two-layered core has an overall diameter within a range having a lower limit of 1.20 or 1.30 or 1.40 or 1.50 or 1.51 or 1.52 or 1.525 inches and an upper limit of 1.54 or 1.55 or 1.555 or 1.56 or 1.59 or 1.62 or 1.64 inches.

Cover Structure

The golf ball cores of this invention may be enclosed with one or more cover layers. For example, golf ball having inner and outer cover layers may be made. In addition, as discussed above, an intermediate (mantle) layer may be disposed between the core and cover layers. The intermediate layer preferably has good moisture vapor barrier properties to prevent moisture from penetrating into the core structure. The cover layers preferably have good impact durability and scuff-resistance. The polyamide compositions of this invention may be used to form at least one of the intermediate and/or cover layers. In other versions, the intermediate layer and cover layers are formed from polymeric materials other than the polyamide compositions of this invention.

For example, the golf ball sub-assembly may include a core (and optional intermediate layer), and an inner cover layer disposed about the core structure. Then, an outer cover comprising the polyamide composition of this invention may be applied over the inner cover. In another version, the golf ball sub-assembly includes the core (and optional intermediate layer) and an inner cover comprising the polyamide composition of this invention disposed about the core. An outer cover made of a polyamide or other polymer material may be applied over the polyamide inner cover. In some versions, the inner cover layer is harder than the outer cover layer; while in other versions, the hardness level is reversed, that is, the outer cover layer is harder than the inner cover.

More particularly, in one version, a golf ball comprising a rubber core, an inner cover layer formed from an ionomer resin, and an outer cover layer formed from the polyamide composition of this invention, wherein the polyamide outer cover is softer than the ionomer inner cover, is made. In another version, a golf ball comprising a rubber core, an inner cover layer formed from the polyamide composition of this invention, and an outer cover layer formed from an ionomer resin, wherein the polyamide inner cover is softer than the ionomer outer cover, is made. In yet another version, a golf ball comprising a rubber core, an inner cover made from a relatively soft thermoplastic material such Hytrel® polyester-ether block copolymer or soft ionomer resin, and a relatively hard outer cover layer formed from the polyamide composition of this invention is formed. In this version, the polyamide outer cover is harder than the softer, thermoplastic inner cover.

As discussed above, the polyamide composition of this invention may be used to form one or more layers of the golf ball including, but not limited to, core, intermediate, and cover layers. A wide variety of other materials may be used to form the layers of the golf ball in accordance with this invention including, but not limited to, polyurethanes; polyureas; copolymers, blends and hybrids of polyurethane and polyurea; ethylene acid copolymer ionomer resins (for example, Surlyn® ionomer resins and HPF® 1000 and HPF® 2000, commercially available from DuPont; Iotek® ionomers, commercially available from ExxonMobil Chemical Company; Amplify® 10 ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to help make a golf ball having high resiliency and a soft feel. By the term, "hybrids of polyurethane and polyurea," it is meant to include copolymers and blends of polyurethanes and polyureas.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one preferred embodiment, the ball includes a dual-cover comprising inner and outer cover layers. The inner cover layer is preferably formed from a composition comprising an ionomer or a blend of two or more ionomers that helps impart hardness to the ball. The inner cover layer preferably has a material hardness of 95 Shore C or less, or less than 95 Shore C, or 92 Shore C or less, or 90 Shore C or less, or a material hardness within a range having a lower limit of 60 or 65 or 70 or 75 or 80 or 84 or 85 Shore C and an upper limit of 90 or 92 or 95 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches.

In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont), which is a maleic anhydride-grafted, metallocene-catalyzed ethylene-butene copolymer having about 0.9 wt % maleic anhydride grafted onto the copolymer. One example of a blend of high acid ionomer and maleic anhydride-grafted polymer is 84 wt. %/16 wt. % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In another embodiment, the inner cover layer is formed from a composition comprising a 50/45/5 blend of Surlyn® 8940/Surlyn® 9650/Nucrel® 960, and, in a particularly preferred embodiment, has a material hardness of from 80 to 85 Shore C. In another particular embodiment, the inner cover layer is formed from a composition comprising a 50/25/25 blend of Surlyn® 8940/Surlyn® 9650/Surlyn® 9910, preferably having a material hardness of about 90 Shore C. In one preferred version, a blend of 50% Surlyn® 7940 and 50% Surlyn® 8940 is used to form the inner cover. In yet another embodiment, the inner cover layer is preferably formed from a composition comprising a 50/50 blend of Surlyn® 8940/Surlyn® 9650, preferably having a material hardness of about 86 Shore C. Surlyn® 8940 is an ethylene/methacrylic acid copolymer in which the MAA acid groups have been partially neutralized with sodium ions. Surlyn® 9650 and Surlyn® 9910 are two different grades of ethylene/methacrylic acid copolymer in which the MAA acid groups have been partially neutralized with zinc ions. Surlyn® 7940 is a copolymer of about 85% ethylene and 15% methacrylic acid that has been neutralized with lithium ions. Nucrel® 960 is an ethylene/methacrylic acid copolymer resin nominally made with 15 wt % methacrylic acid, and available from DuPont.

As discussed above, the dual-core of the golf ball may be enclosed with a single-layered or multi-layered covers. In one embodiment, a single-layered cover having a thickness in the range of about 0.015 to about 0.090 inches, more preferably about 0.030 to about 0.070 inches, is formed. The cover has a hardness of about Shore D 80 or less, more preferably 70 or less, and most preferably about 60 or less. In another embodiment, a multi-layered cover comprising inner and outer cover layers is formed, where the inner cover layer preferably has a thickness of about 0.011 inches to about 0.110 inches, more preferably about 0.02 inches to about 0.08 inches. In this version, the inner cover layer is formed from a blend of partially- or fully-neutralized ionomers, and the cover has a Shore D hardness of greater than about 55, more preferably greater than about 60, and most preferably greater than about 65. The outer cover layer, in this embodiment, preferably has a thickness of about 0.010 inches to about 0.100 inches, more preferably about 0.02 inches to about 0.06 inches, and most preferably about 0.025 inches to about 0.045 inches, with a hardness of about 80 Shore D or less, more preferably 70 or less, and most preferably about 60 or less. Thus, the cover may comprise two or more layers and preferably has an overall thickness of about 0.020 to about 0.160 inches. The inner cover layer is harder than the outer cover layer in this version. In one example, the outer cover layer is formed from a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed; that is, the outer cover layer is harder than the inner cover layer.

Golf Ball Constructions

As discussed above, the thermoplastic polyamide compositions of this invention may be used to form a core for any suitable ball construction, including, for example, two-piece, three-piece, four-piece, and five-piece designs.

The solid cores for the golf balls of this invention may be made using any suitable conventional technique such as, for example, compression or injection molding. Typically, the inner core is formed by compression molding a slug of uncured or lightly cured rubber material into a spherical structure. The outer core, which surrounds the inner core, is formed by molding the polyamide composition over the inner core. Compression or injection molding techniques may be used. Then, the intermediate and/or cover layers are applied. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball subassembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the ball subassembly in a compression mold. Under sufficient heating and pressure, the shells fuse together to form an inner cover layer that surrounds the subassembly. In another method, the ionomer composition is injection-molded directly onto the core using retractable pin injection molding. An outer cover layer comprising a polyurethane composition may be formed by using a casting process.

For example, in one version of the casting process, a liquid mixture of reactive polyurethane prepolymer and chain-extender (curing agent) is poured into lower and upper mold cavities. Then, the golf ball subassembly is lowered at a controlled speed into the reactive mixture. Ball suction cups can hold the ball subassembly in place via reduced pressure or partial vacuum. After sufficient gelling of the reactive mixture (typically about 4 to about 12 seconds), the vacuum is removed and the intermediate ball is released into the mold cavity. Then, the upper mold cavity is mated with the lower mold cavity under sufficient pressure and heat. An exothermic reaction occurs when the polyurethane prepolymer and chain extender are mixed and this continues until the cover material encapsulates and solidifies around the ball subassembly. Finally, the molded balls are cooled in the mold and removed when the molded cover is hard enough so that it can be handled without deformation.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Figure 2:
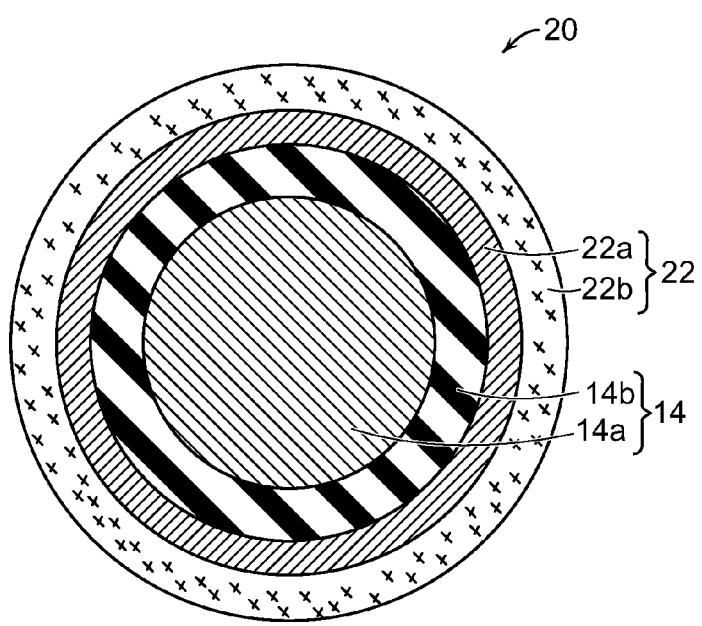
FIG. 2 is a cross-sectional view of a four-piece golf ball having a dual-core comprising an inner core/outer core; an inner cover layer; and an outer cover layer made in accordance with the present invention.

Referring to FIG. 1, one version of a golf ball that can be made in accordance with this invention is generally indicated at (10). The ball (10) contains a dual-core (14) having an inner core (center) (14a) and outer core layer (14b) surrounded by a single-layered cover (16). The center (14a) is formed preferably from a rubber composition as discussed above. The outer core layer (14b) is formed from a polyamide composition as discussed above. In FIG. 2, a golf ball (20) containing the above-described dual-core (14) is surrounded by a dual-cover (22) having an inner cover layer (22a) and outer cover layer (22b), which may be formed from any of the cover materials described above.

The surfaces of the golf balls shown in FIGS. 1-2 may have various dimple patterns to modify the aerodynamic properties of the ball. It should be understood the golf balls shown in FIGS. 1-2 are for illustrative purposes only and not meant to be restrictive. Other golf ball constructions can be made in accordance with this invention.

For example, a golf ball containing an inner core (center); an intermediate core layer; and an outer core layer may be made. The center preferably has a diameter within a range having a lower limit of 0.100 or 0.125 or 0.250 inches and an upper limit of 0.375 or 0.500 or 0.750 or 1.00 or 1.30 inches. The intermediate core layer preferably has a thickness within a range having a lower limit of 0.050 or 0.100 or 0.150 or 0.200 inches and an upper limit of 0.300 or 0.350 or 0.400 or 0.500 inches. The outer core layer encloses the center and intermediate core layer structure such that the multi-layer core has an overall diameter within a range having a lower limit of 1.40 or 1.45 or 1.50 or 1.55 inches and an upper limit of 1.58 or 1.60 or 1.62 or 1.66 inches.

In one embodiment, the inner core (center) is made of the polyamide/acid anhydride-modified composition of this invention. The surrounding intermediate core layer is made of a rubber composition comprising a base rubber such as, for example, polybutadiene, polyisoprene, ethylene propylene rubber (EPR), ethylene propylene diene rubber (EPDM), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, and polystyrene elastomers. Finally, the outer core layer also is made of the polyamide/acid anhydride-modified composition of this invention.

In the above-described version, the center and outer core layers (polyamide compositions) preferably each has an outer surface hardness of 40 Shore D or greater, more preferably a surface hardness of 60 Shore C or greater, and most preferably a surface hardness of 70 Shore C or greater. For example, the center may have an outer surface hardness within a range having a lower limit of 45 or 55 or 65 Shore D and an upper limit of 75 or 85 or 95 Shore D. Meanwhile, the intermediate core layer (rubber composition) may have an outer surface hardness that is less than that of the center and is preferably 50 Shore C or less; or 60 Shore C or less; or 70 Shore C or less; or 75 Shore C or less; or 80 Shore C or less.

It is recognized that additional golf ball constructions can be made without departing from the spirit and scope of the present invention. For example, in another version, a golf ball containing a multi-layered core having: i) an inner core (center) made of a rubber composition as described above; ii) a surrounding intermediate core layer made of the polyamide composition of this invention; and iii) an outer core layer made of a rubber composition, can be manufactured. In yet another version, both the inner core (center) and intermediate core layer each are made of a rubber composition; and the outer core layer is made of the polyamide composition of this invention. In a further embodiment, both the inner core (center) and intermediate core layer are made of the polyamide composition of this invention; and the outer core layer is made of a rubber composition.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240. JIS-C hardness was measured according for this Test Method K6301 (Japanese Standards Association).

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR").

The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from

We claim:

1. A golf ball, comprising:
   a) a dual core comprising an inner and outer core layer, the inner core having an outer surface and geometric center and the outer core layer having an outer surface and inner surface; the inner core comprising a rubber composition and the outer core layer comprising a polyamide composition, and the polyamide composition comprising a blend of transparent and non-transparent polyamides, wherein the blend contains about 40% by weight transparent polyamide polymer, and the composition has a transparency of less than fifty (50) percent per ASTM D1003 test procedures using an illuminate C light source,
   wherein the center of the inner core and surface of the outer core layer each has a hardness, and the surface hardness of the outer core layer is greater than the center hardness of the inner core; and
   b) a cover having at least one layer disposed about the core.

2. The golf ball of claim 1, wherein the polyamide composition comprises a transparent polyamide having an amorphous, quasi-amorphous, semicrystalline, or microcrystalline structure.

3. The golf ball of claim 1, wherein the polyamide composition comprises a transparent polyether-amide block copolymer.

4. The golf ball of claim 1, wherein the transparent polyamide has a glass transition temperature in the range of about 75° to about 160° C.

5. The golf ball of claim 4, wherein the transparent polyamide has a glass transition temperature in the range of about 80° to about 95° C.

6. The golf ball of claim 1, wherein the transparent polyamide has a Charpy notched impact-resistance of at least about 15 kJ/m$^2$ at 23° C.

7. The golf ball of claim 6, wherein the transparent polyamide has a Charpy notched impact-resistance of at least about 50 kJ/m$^2$ at 23° C.

8. The golf ball of claim 1, wherein the transparent polyamide has a ratio of Charpy notched impact-resistance measured at 23° C. to Charpy notched impact-resistance measured at −30° C. of at least about 2.0.

9. The golf ball of claim 1, wherein the transparent polyamide has a ratio of Charpy notched impact-resistance measured at 23° C. to Charpy notched impact-resistance measured at −30° C. of at least about 4.0.

10. The golf ball of claim 1, wherein the transparent polyamide has a transparency of at least about 85%.

11. The golf ball of claim 10, wherein the transparent polyamide has a transparency of at least about 90%.

12. The golf ball of claim 1, wherein the polyamide composition further comprises about 1 to about 60% by weight of an acid anhydride-modified polyolefin.

13. The golf ball of claim 12, wherein the acid anhydride-modified polyolefin is an ethylene-based copolymer and the acid anhydride used to modify the ethylene-based copolymer is selected from the group consisting of maleic, fumaric, nadic, itaconic, and clorendic acid anhydrides, and substituted derivatives thereof.

14. The golf ball of claim 1, wherein the composition further comprises a plasticizer.

15. The golf ball of claim 14, wherein the plasticizer is selected from the group consisting of N-butylbenzenesulfonamlde (BBSA); N-ethylbenzenesulfonamide (EBSA); N-propylbenzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate, an alkyl or aryl fatty acid ester.

16. The golf ball of claim 1, wherein the center hardness of the inner core is about 15 Shore D or greater and the surface hardness of the outer core is about 40 Shore D or greater, the surface hardness of the outer core layer being greater than the center hardness of the inner core.

17. The golf ball of claim 1, wherein the cover is a single layer having a thickness of about 0.015 to about 0.090 inches and is formed from a thermoplastic or thermoset material.

18. The golf ball of claim 1, wherein the cover comprises two or more layers and has an overall thickness of about 0.020 to about 0.160 inches and wherein each cover layer is formed from a thermoplastic or thermoset material.

* * * * *